(12) United States Patent
Kiyota

(10) Patent No.: US 8,677,070 B2
(45) Date of Patent: Mar. 18, 2014

(54) CACHE MEMORY CONTROL APPARATUS AND CACHE MEMORY CONTROL METHOD

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/654,312

(22) Filed: Dec. 16, 2009

(65) Prior Publication Data

US 2010/0106913 A1    Apr. 29, 2010

Related U.S. Application Data

(63) Continuation of application No. PCT/JP2007/062400, filed on Jun. 20, 2007.

(51) Int. Cl.
*G06F 12/00* (2006.01)

(52) U.S. Cl.
USPC ........... 711/118; 711/131; 711/141; 711/149; 711/151; 711/152; 711/154; 711/158

(58) Field of Classification Search
USPC ......... 711/118, 131, 141, 149, 151, 152, 154, 711/158
See application file for complete search history.

(56) References Cited

U.S. PATENT DOCUMENTS

| | | | |
|---|---|---|---|
| 5,765,199 A | 6/1998 | Chang et al. | |
| 5,784,586 A | 7/1998 | Simone et al. | |
| 6,349,382 B1 | 2/2002 | Feiste et al. | |
| 6,499,090 B1 * | 12/2002 | Hill et al. | 711/158 |
| 6,732,242 B2 * | 5/2004 | Hill et al. | 711/158 |
| 6,745,289 B2 * | 6/2004 | Gruner et al. | 711/119 |
| 2003/0188107 A1 * | 10/2003 | Hill et al. | 711/137 |
| 2005/0210204 A1 | 9/2005 | Yamazaki | |
| 2006/0026363 A1 | 2/2006 | Yamazaki | |

FOREIGN PATENT DOCUMENTS

| | | |
|---|---|---|
| EP | 1 622 029 A2 | 2/2006 |
| JP | 7-311711 | 11/1995 |
| JP | 2000-259412 | 9/2000 |
| JP | 2006-48181 | 2/2006 |
| WO | 01/50256 A1 | 7/2001 |
| WO | 2006/061767 A1 | 6/2006 |

OTHER PUBLICATIONS

International Search Report for PCT/JP2007/062400, mailed Sep. 18, 2007.
International Preliminary Report on Patentability mailed Jan. 7, 2010 and issued in corresponding International Patent Application PCT/JP2007/062400.
European Search Report dated Aug. 2, 2011 in corresponding European Patent Application 07767239.2.

* cited by examiner

*Primary Examiner* — Arpan P. Savla
(74) *Attorney, Agent, or Firm* — Staas & Halsey LLP

(57) ABSTRACT

According to an aspect of the embodiment, an FP includes a plurality of entries which holds requests to be processed, and each of the plurality of entries includes a requested flag indicating that data transfer is once requested. An FP-TOQ holds information indicating an entry holding the oldest request. A data transfer request prevention determination circuit checks the requested flag of a request to be processed and the FP-TOQ, and when a transfer request of data as a target of the request to be processed has already been issued and the entry holding the request to be processed is not the entry indicated by the FP-TOQ, transmits a signal which prevents the transfer request of the data to a data transfer request control circuit. Even when a cache miss occurs in a primary cache RAM, the data transfer request control circuit does not issue a data transfer request when the signal which prevents the transfer request is received.

2 Claims, 22 Drawing Sheets

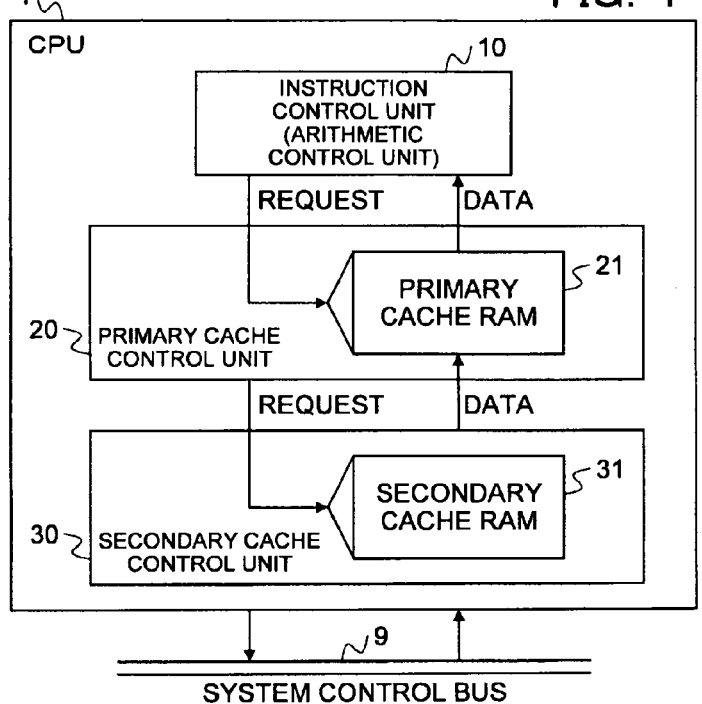
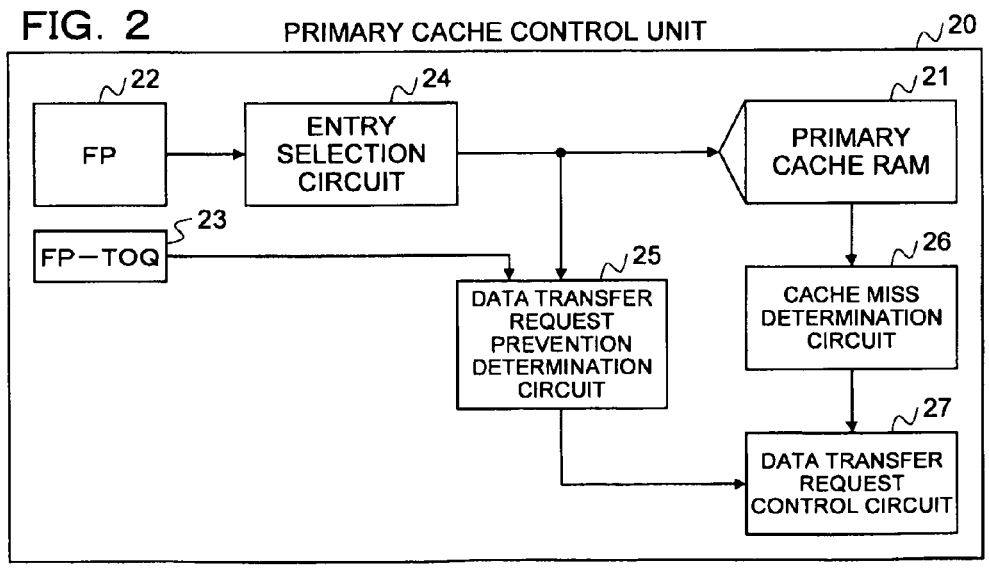

CACHE MEMORY CONTROL APPARATUS AND CACHE MEMORY CONTROL METHOD

CROSS-REFERENCE TO RELATED APPLICATIONS

This is a continuation application of PCT application serial number PCT/JP2007/062400, filed on Jun. 20, 2007.

FIELD

The embodiments discussed herein are related to a cache memory control apparatus and a cache memory control method.

BACKGROUND

In a processor that processes memory accesses in an out-of-order manner, a cache control unit can process requests of memory access from an instruction control unit regardless of the order of the requests, or in no particular order.

FIGS. 16 and 17 are diagrams for explaining examples of reference, registration, and replacement of data in a primary cache control unit. In the examples illustrated in FIGS. 16 and 17, a primary cache RAM 210 of a primary cache control unit 200 is formed by a set associative system which includes two ways, way-0 and way-1.

When an instruction control unit 100 requests an instruction of memory access, the primary cache control unit 200 temporarily holds the request in an FP (Fetch Port) 220 which includes a plurality of entries. FIG. 16A illustrates an example that a load instruction is issued as an instruction of memory access.

The primary cache control unit 200 uses a part of a virtual address of the requests held in the FP 220 as cache indexes to refer to a line corresponding thereto of the primary cache RAM 210. At the same time, a physical address corresponding to the virtual address is obtained by address conversion (refer to FIG. 16A).

When the physical addresses of data registered in the reference lines of the primary cache RAM 210 do not correspond to the physical address converted from the virtual address, or when the data registered in the reference lines of the primary cache RAM 210 is invalid (Invalid), the primary cache control unit 200 requests a secondary cache control unit 300 to transfer data indicated by the physical address converted from the virtual address. In this case, both data of the reference lines of the way-0 and the way-1 are valid (Valid) in the primary cache RAM 210, but the both data do not correspond to a physical address-A converted from the virtual addresses. Therefore, a data transfer request is issued to the secondary cache control unit 300 (refer to FIG. 16A).

At this point, when both data of the way-0 and the way-1 registered in the reference lines of the primary cache RAM 210 are valid (Valid) data, a replacement control unit 290 selects one of the two ways as a replacement target. And, the replacement control unit 290 evicts out the data registered in the reference line of the selected way from the primary cache RAM 210 to the secondary cache control unit 300, or invalidates (Invalid) the data. Hereinafter, as illustrated in FIG. 16B, it is assumed in the description that the way-0 is selected as a replacement target, and that the data registered in the reference line of the way-0 is invalidated (Invalid).

The primary cache control unit 200 registers, in the selected way, data transferred from the secondary cache control unit 300 and the physical address of the data. In this case, the transferred data and the physical address-A are registered in the way-0 (refer to FIG. 17A).

The primary cache control unit 200 re-executes an instruction of memory access held in the FP 220. In this case, the load instruction held in the FP 220 is re-executed, and the line corresponding thereto of the primary cache RAM 210 is referred. At this point, there is a valid data in the way-0 that the physical address corresponds. Therefore, the data is transmitted to the instruction control unit 100, the FP 220 is released, and then the processing is finished (refer to FIG. 17B).

Patent Document 1 is an example of a document describing a prior art related to the control of cache memory. Patent Document 1 describes a technique for increasing throughput of instructions in a processor that executes load instructions and store instructions in an out-of-order manner.

Patent Document 1: Japanese Laid-Open Patent Publication No. 2000-259412

SUMMARY

According to an aspect of the embodiment, a cache memory control apparatus includes a cache memory; a fetch port including a plurality of entries which holds access requests to the cache memory; a queue register holding information which indicates an entry holding the oldest access request among the plurality of entries of the fetch port; an entry selection circuit selecting an access request to be processed next from the access requests held in the plurality of entries of the fetch port; a cache miss determination circuit determining whether there is data of the access request selected by the entry selection circuit in the cache memory; a data transfer request control circuit requesting, when there is no data of the access request in the cache memory, transfer of the data to the cache memory from the outside; a requested flag provided for each entry of the fetch port, and indicating whether the data transfer is requested by the data transfer request control circuit; and a data transfer request prevention determination circuit transmitting, when a requested flag of an entry which holds the access request selected by the entry selection circuit indicates that the data transfer is requested, and when the entry is different from the entry held by the queue register, a signal which prevents the data transfer request caused by the access request to the data transfer request control circuit.

The present embodiment can prevent undesirable replacement of data on a cache, thereby improving the performance of cache control in a processor that executes an out-of-order processing of memory accesses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a structure example of a processor according to the present embodiment;

FIG. 2 is a diagram illustrating a structure example of a primary cache control unit according to the present embodiment;

DESCRIPTION OF EMBODIMENTS

In the conventional technique, when instructions of a plurality of memory accesses is processed which have different physical addresses but same cache index, the following problem occurs. That is, there is a case that replacement processings evict out the target data from the cache before the instructions refer to the data on the cache, so that the instructions are not finished in some cases. Hereinafter, the problem is described with a specific example.

FIGS. 18 to 24 are diagrams for explaining the problem of a processing in a primary cache control unit. The problem is described according to an example in which the primary cache RAM 210 of the primary cache control unit 200 is formed by a set associative system including two ways, way-0 and way-1.

Figure 18A:
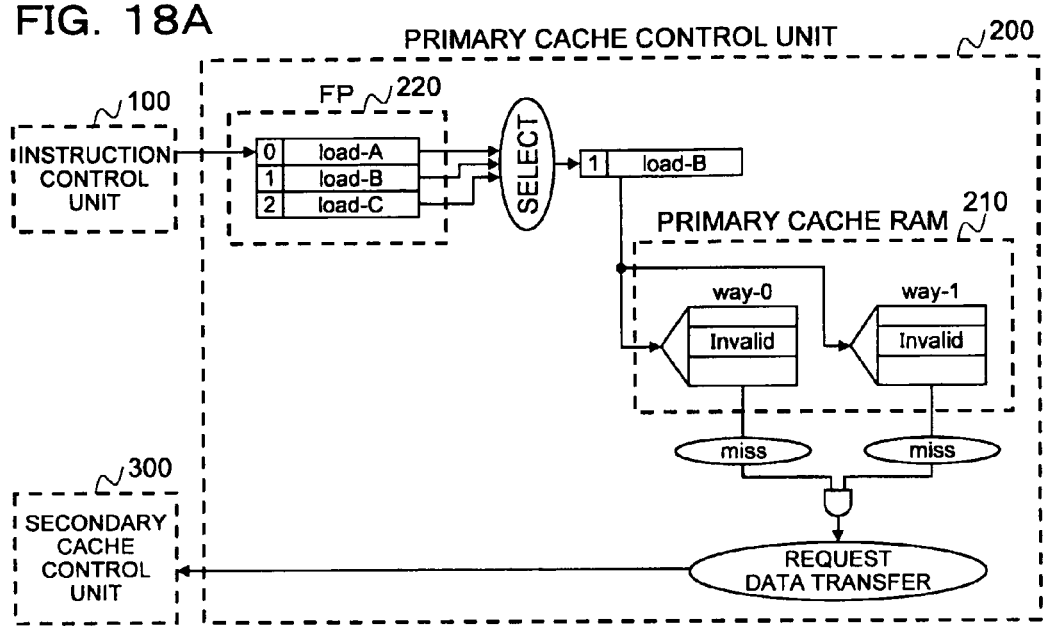
FIGS. 18 to 24 are diagrams for explaining a problem of a processing in the primary cache control unit.

As illustrated in FIG. 18, it is assumed that the instruction control unit 100 issues three memory access requests to the primary cache control unit 200. In this case, for convenience, the three memory access requests are written as load-A, load-B, and load-C. It is assumed that the three memory access requests are issued in order of load-A, load-B, and load-C, and that cache indexes are the same but physical addresses are different in the three memory access requests. The requests load-A, load-B, and load-C are temporarily held in entries 0, 1, and 2 of the FP 220 of the primary cache control unit 200 in sequence (refer to FIG. 18A). In FIGS. 18 to 24, numbers written on left of the memory access requests are numbers indicating entries of the FP 200.

The primary cache control unit 200 has a function of processing requests in an out-of-order manner. In this circumstance, it is assumed, for example, that the primary cache RAM 210 is accessed to process the load-B before processing of the load-A, which is the oldest request. At this point, when there is no target data of the load-B in the primary cache RAM 210, data transfer is requested to the secondary cache control unit 300 (refer to FIG. 18A).

Figure 18B:
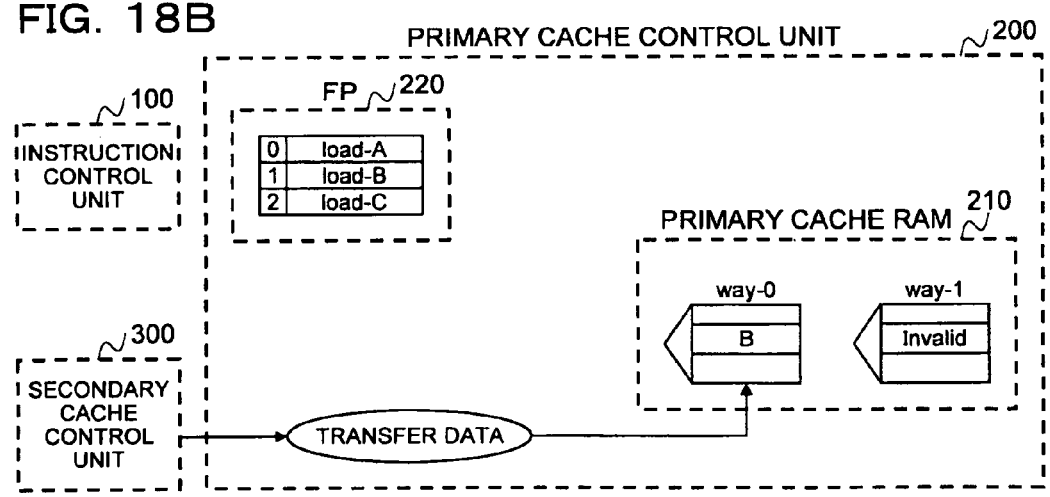

Then, the data of the load-B is transferred from the secondary cache control unit 300, and registered in the way-0 of the primary cache RAM 210 (refer to FIG. 18B). Between the data transfer request and the registration of the data, only one processing of the same cache index can be executed at a time. Therefore, processings of the load-A and the load-C are on standby in the FP 220.

After the data registration for the load-B is finished, it is assumed that the primary cache RAM 210 is accessed to process the load-C before the processing of the load-A and the reprocessing of the load-B. At this point, when there is no target data of the load-C in the primary cache RAM 210, data transfer is requested to the secondary cache control unit 300 (refer to FIG. 19A).

Figure 19A:
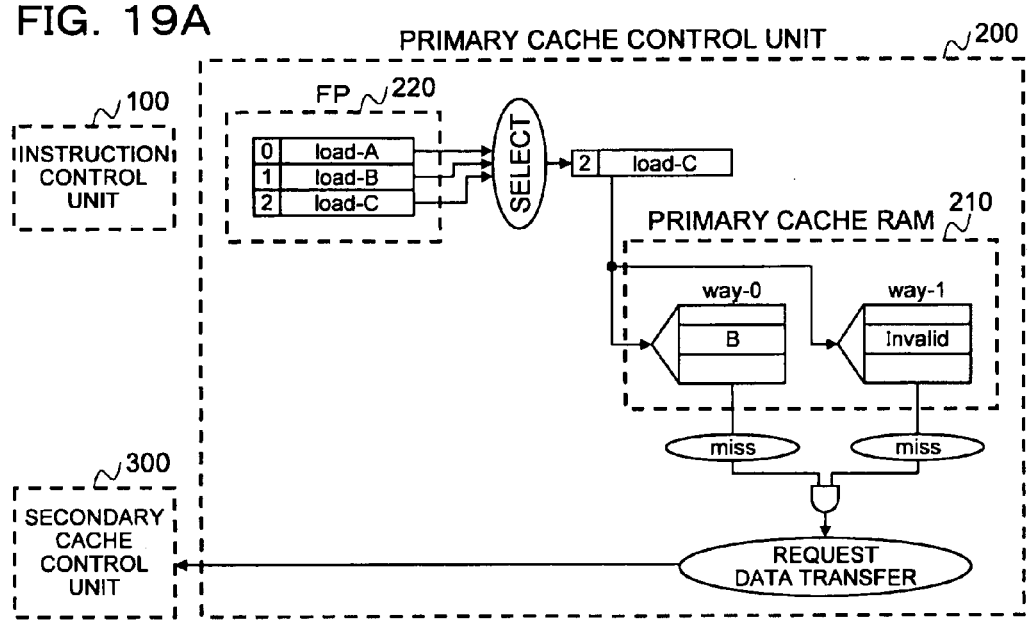
Figure 19B:
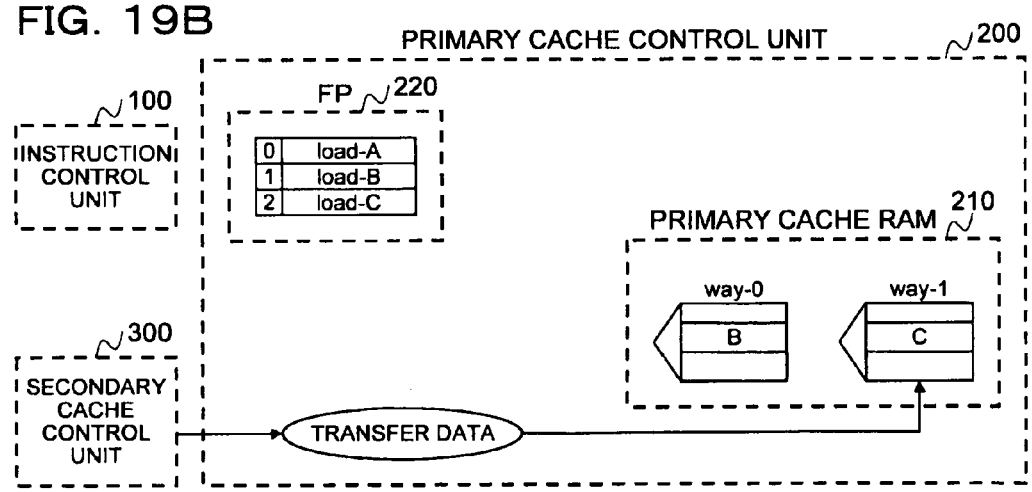

Then, the data of the load-C is transferred from the secondary cache control unit 300, and registered in the way-1 of the primary cache RAM 210 (refer to FIG. 19B). Between the data transfer request and the registration of the data, only one processing of the same cache index can be executed at a time. Therefore, the processings of the load-A and the load-B are on standby in the FP 220.

After the data registration for the load-C is finished, it is assumed that the primary cache RAM 210 is accessed to process the load-A before the reprocessing of the load-B and reprocessing of the load-C. At this point, since there is no target data of the load-A in the primary cache RAM 210, data transfer is requested to the secondary cache control unit 300 (refer to FIG. 20A).

Figure 20A:
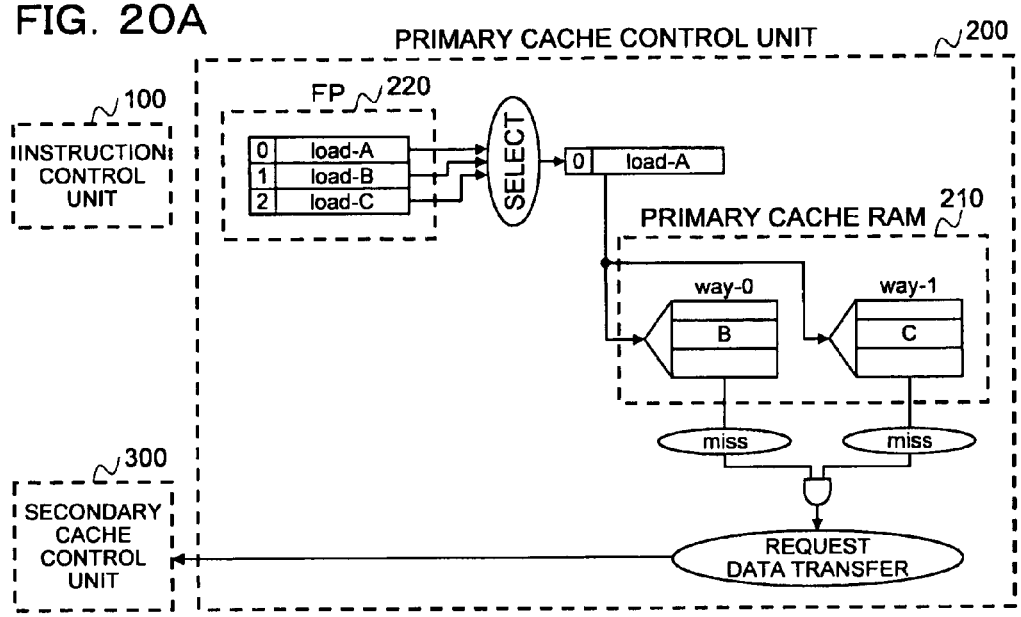
Figure 20B:
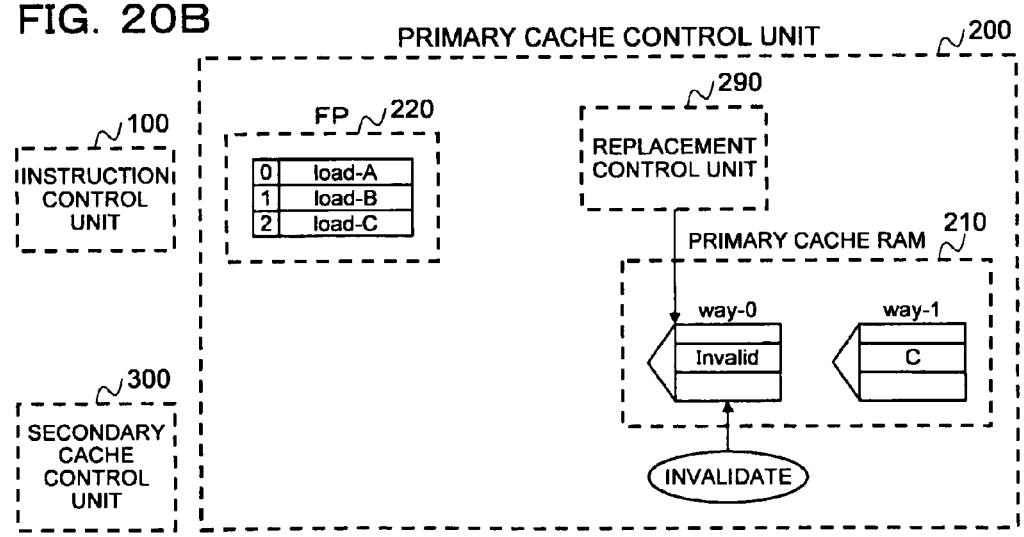

At the same time, since there is valid data in both the way-0 and the way-1, the replacement control unit 290 sets the way-0 as a replacement target, and invalidates (Invalid) the target data of the load-B in the way-0 (refer to FIG. 20B).

Figure 21A:
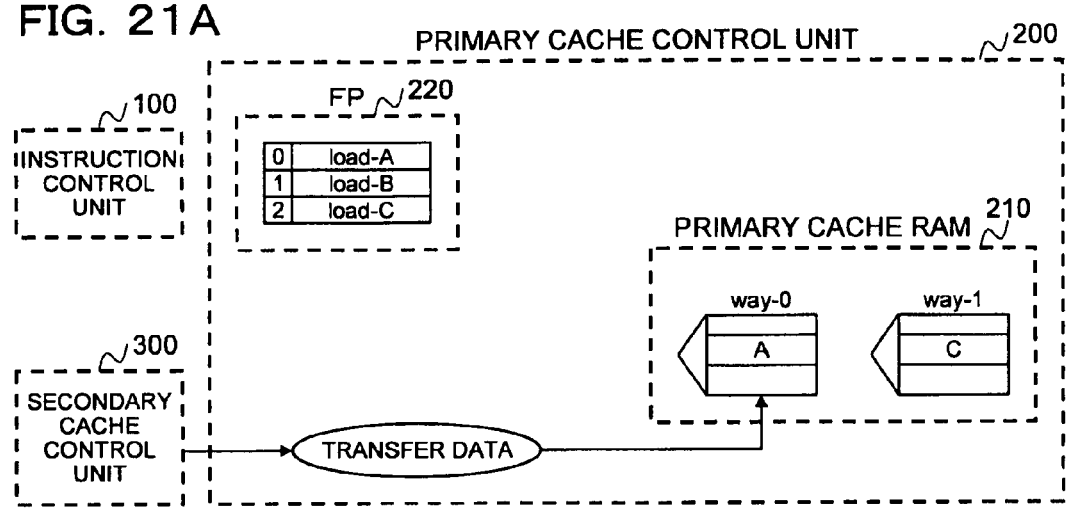
Figure 21B:
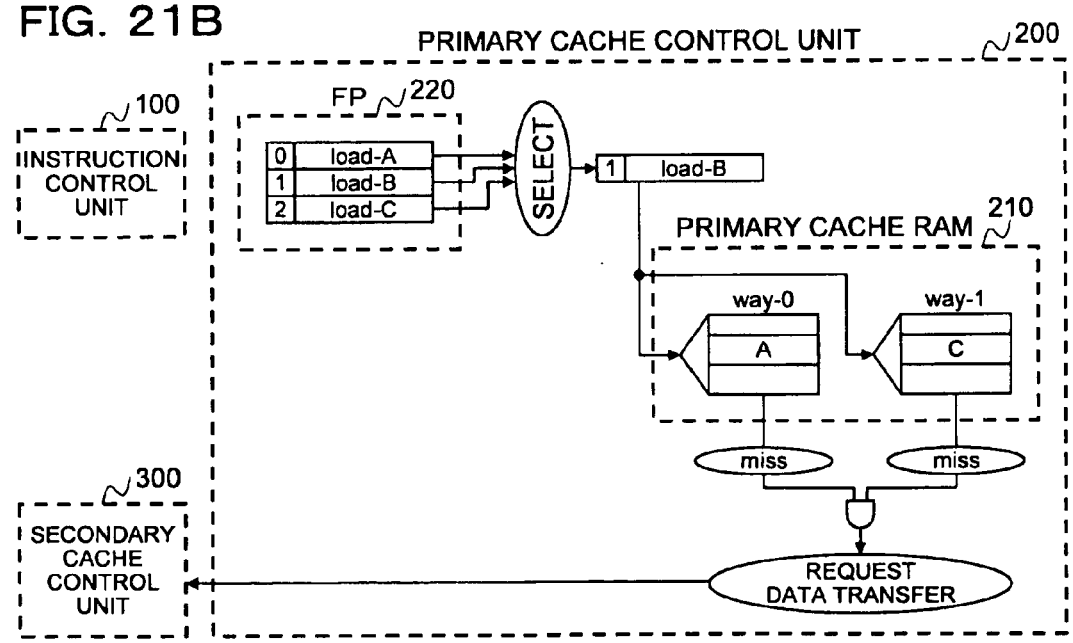

Then, the data of the load-A is transferred from the secondary cache control unit 300, and registered in the way-0 of the primary cache RAM 210 (refer to FIG. 21A). Between the data transfer request and the registration of the data, only one processing of the same cache index can be executed at a time. Therefore, the processing of the load-B and the processing of the load-C are on standby in the FP 220.

After the data registration for the load-A is finished, it is assumed that the primary cache RAM 210 is accessed to process the load-B before the reprocessing of the load-A and the reprocessing of the load-C. At this point, since the target data of the load-B previously registered in the way-0 is replaced by the target data of the load-A, the data transfer is again requested to the secondary cache control unit 300 (refer to FIG. 21B).

Figure 22A:
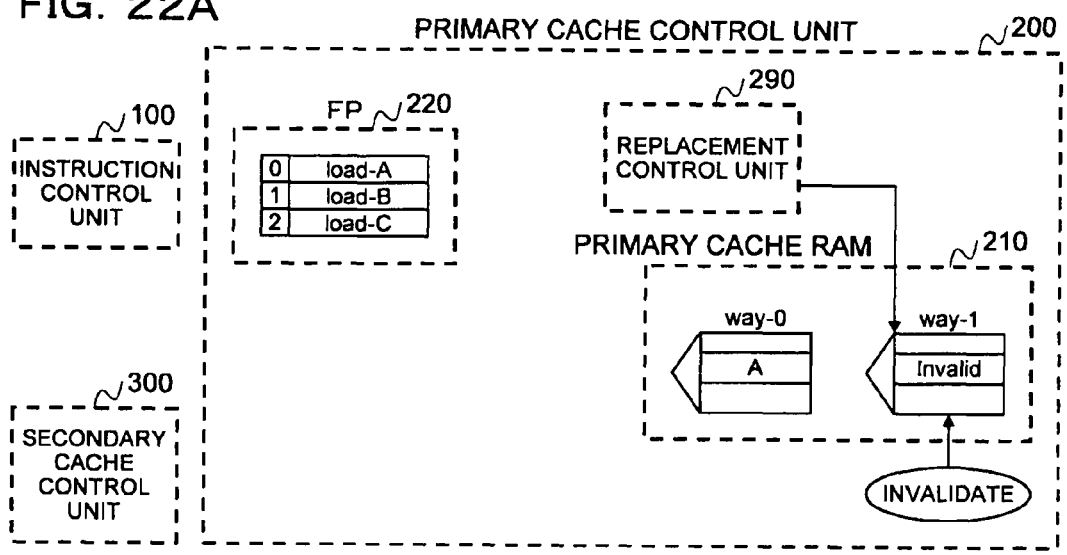

At the same time, since there is valid data in both the way-0 and the way-1, the replacement control unit 290 sets the way-1 as a replacement target, and invalidates (Invalid) the target data of the load-C in the way-1 (refer to FIG. 22A).

Figure 22B:
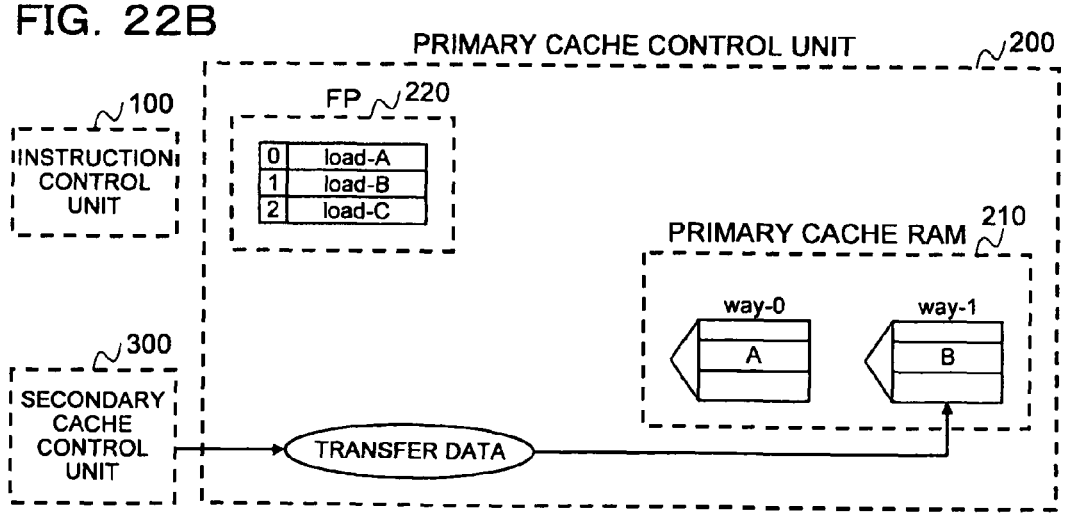

Then, the data of the load-B is transferred from the secondary cache control unit 300, and registered in the way-1 of the primary cache RAM 210 (refer to FIG. 22B). Between the data transfer request and the registration of the data, only one processing of the same cache index can be executed at a time. Therefore, the processing of the load-A and the processing of the load-C are on standby in the FP 220.

After the data registration for the load-B is finished, it is assumed that the primary cache RAM 210 is accessed to process the load-C before the reprocessing of the load-A and the reprocessing of the load-B. At this point, since the target data of the load-C previously registered in the way-1 is replaced by the target data of the load-B, the data transfer is again requested to the secondary cache control unit 300 (refer to FIG. 23A).

Figure 23A:
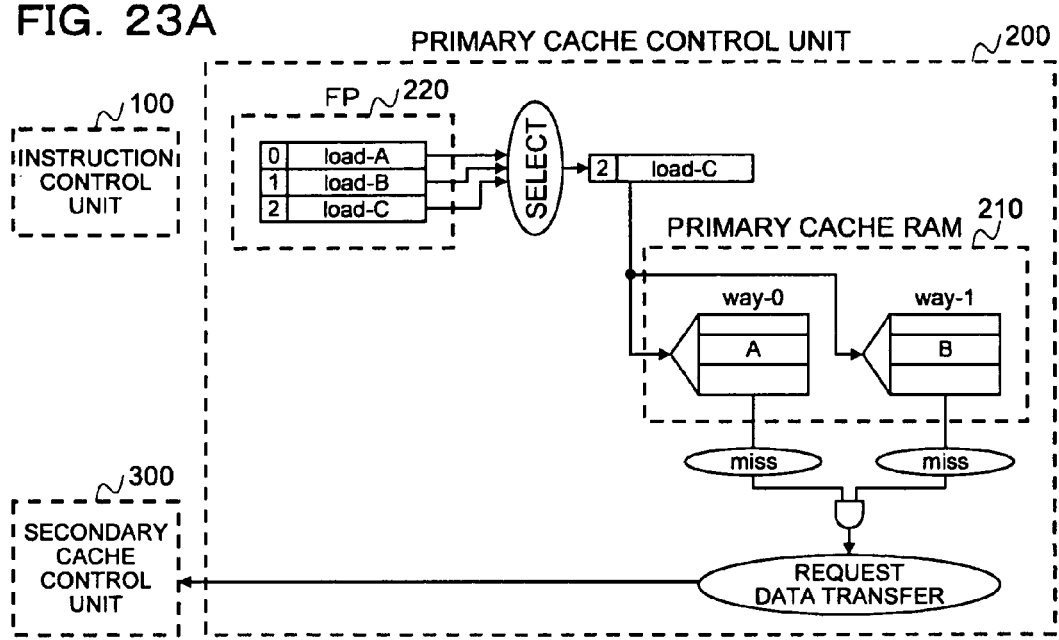
Figure 23B:
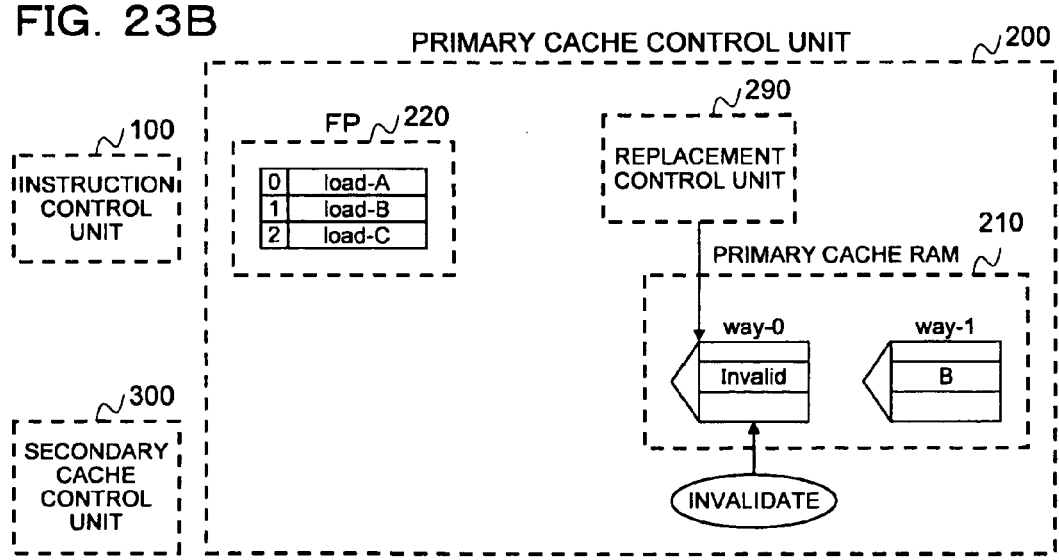

At the same time, since there is valid data in both the way-0 and the way-1, the replacement control unit 290 sets the way-0 as a replacement target, and invalidates (Invalid) the target data of the load-A in the way-0 (refer to FIG. 23B).

Figure 24:
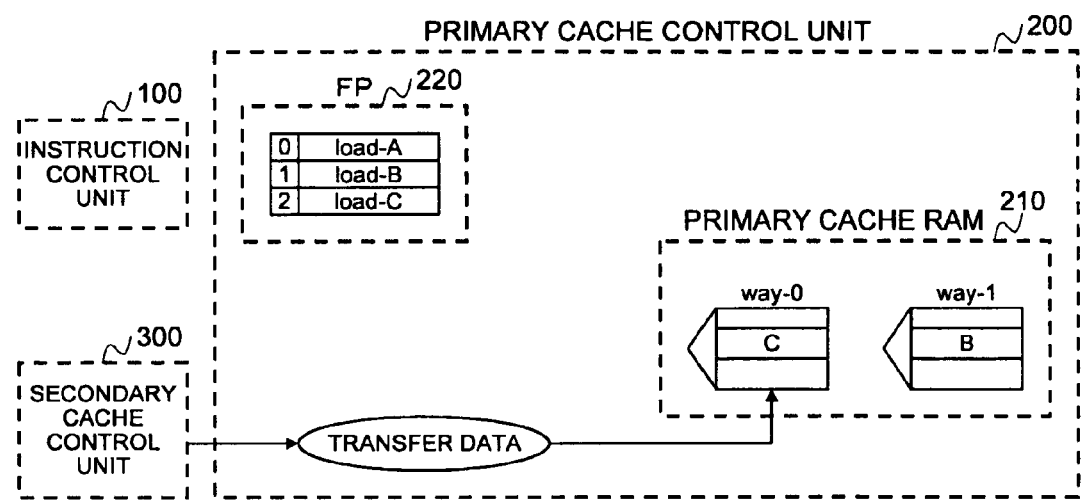

Then, the data of the load-C is transferred from the secondary cache control unit 300, and registered in the way-0 of the primary cache RAM 210 (refer to FIG. 24). Between the data transfer request and the registration of the data, only one processing of the same cache index can be executed at a time.

Therefore, the processing of the load-A and the processing of the load-B are on standby in the FP 220.

Subsequently, when a series of processings circulate in order of the load-A, the load-B, the load-C, . . . , the execution of the instructions is not finished.

The present embodiment provides a technique to solve the problem, and to prevent undesirable replacement of data on cache generated by instructions of a plurality of memory accesses with the same cache index and with different physical addresses.

To solve the problem, the present embodiment prepares, for each entry of an FP, a flag indicating that data transfer is once requested, prepares information indicating an entry holding the oldest request, and not requesting again data transfer by processing of the request held in the entry in which the data transfer is once requested until the entry becomes the oldest among all entries in the FP, thereby preventing continuous replacement of the target data of the request to be processed.

According to the embodiment, in cache control of a processor that processes memory accesses in an out-of-order manner, after a data area as an access target of an instruction is registered in the cache and before the instruction accesses the cache, repetitions of a processing can be prevented in which a cache access of another instruction for accessing another data area replaces the data area and the registration of the data area is requested again.

Furthermore, according to the embodiment, the cache memory control apparatus may include a number count circuit. The number count circuit counts, for each cache index indicating data storage location in the cache memory, a number of times that re-requests of data transfer are issued by a data transfer request control circuit. The number of times is counted when a cache miss determination circuit determines that there is no data of the access request in the cache memory, and when the data transfer request prevention determination circuit determines that a requested flag of an entry of a fetch port holding the access request indicates that the data transfer is requested and that the entry is the same as an entry held by a queue register.

According to the embodiment, the number of times can be counted which prevents replacement of a specific cache entry by data as targets of a plurality of requests, and a program can be designed by using this as reference information for tuning the program.

Preferred embodiments of the present invention will be explained with reference to accompanying drawings.

FIG. 1 is a diagram illustrating a structure example of a processor according to the present embodiment. A CPU 1 includes an instruction control unit (arithmetic control unit) 10, a primary cache control unit 20, and a secondary cache control unit 30. The CPU 1 is connected to an external storage device, etc., through a system control bus 9. The primary cache control unit 20 includes a primary cache RAM 21 with small capacity but fast access. The secondary cache control unit 30 includes a secondary cache RAM 31 with larger capacity but slower access compared to the primary cache RAM 21.

An instruction control unit (arithmetic control unit) 10 issues a request, such as a load instruction and a store instruction, to the primary cache control unit 20. The primary cache control unit 20 receives the request, and checks whether there is data as a target of the request from the instruction control unit (arithmetic control unit) 10 in the primary cache RAM 21. And, when there is the data, the primary cache control unit 20 returns the data to the instruction control unit (arithmetic control unit) 10. When there is no data as the target of the request from the instruction control unit (arithmetic control unit) 10, transfer of the data is requested to the secondary cache control unit 30.

The secondary cache control unit 30 receives the request of data transfer from the primary cache control unit 20, and checks whether there is the data requested from the primary cache control unit 20 in the secondary cache RAM 31. And, when there is the data, the secondary cache control unit 30 returns the data to the primary cache control unit 20. When there is no data requested from the primary cache control unit, transfer of the data is requested to an external storage device through the system control bus 9.

FIG. 2 is a diagram illustrating a structure example of the primary cache control unit according to the present embodiment. The primary cache control unit 20 includes a primary cache RAM 21, an FP (Fetch Port) 22, an FP-TOQ (Fetch Port Top Of Queue) 23, an entry selection circuit 24, a data transfer request prevention determination circuit 25, a cache miss determination circuit 26, and a data transfer request control circuit 27.

The FP 22 includes a plurality of entries that hold requests received from the instruction control unit (arithmetic control unit) 10. Each entry of the FP 22 is provided with a requested flag. The requested flag indicates whether a transfer request of data to the secondary cache control unit 30 is generated, and the data is a target of the request held in the entry. The FP-TOQ 23 is a register recording an entry which holds the oldest request among the entries of the FP 22.

The entry selection circuit 24 selects a request to be processed next from the requests held in the entries of the FP 22.

The data transfer request prevention determination circuit 25 checks the requested flag of the request to be processed and the FP-TOQ 23. When the transfer request of the data as the target of the request to be processed is already issued, and when an entry holding the request to be processed is not the entry indicated by the FP-TOQ 23, the data transfer request prevention determination circuit 25 transmits a signal which prevents the transfer request of the data to the data transfer request control circuit 27. The data transfer request prevention determination circuit 25 can be formed by a comparison circuit such as an exclusive OR circuit and a logic circuit such as a NAND circuit, for example.

The cache miss determination circuit 26 determines whether there is data as the target of the request to be processed in the primary cache RAM 21. When there is no data, a cache miss occurs, and that fact is notified to the data transfer request control circuit 27.

The data transfer request control circuit 27 transmits a transfer request of the data to the secondary cache control unit 30, when the cache miss occurs. However, when the data transfer request control circuit 27 receives the signal which prevents the transfer request from the data transfer request prevention determination circuit 25, the data transfer request control circuit 27 does not issue the data transfer request even when the cache miss occurs.

Figure 3:
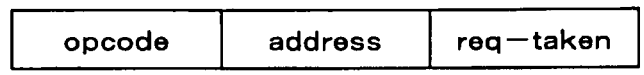
FIG. 3 is a diagram illustrating an example of a constituent element of information held by an entry of an FP.

FIG. 3 is a diagram illustrating an example of constituent elements of information held by the entries of the FP. In the example of FIG. 3, a structure of a part related to the present embodiment in the information held by the entries of the FP 22 is particularly extracted. Each entry of the FP 22 holds information of an instruction code (opcode) indicating a type of the instruction such as a load instruction and a store instruction, an address of data as a target of the instruction, and the requested flag (req-taken).

Figure 4:
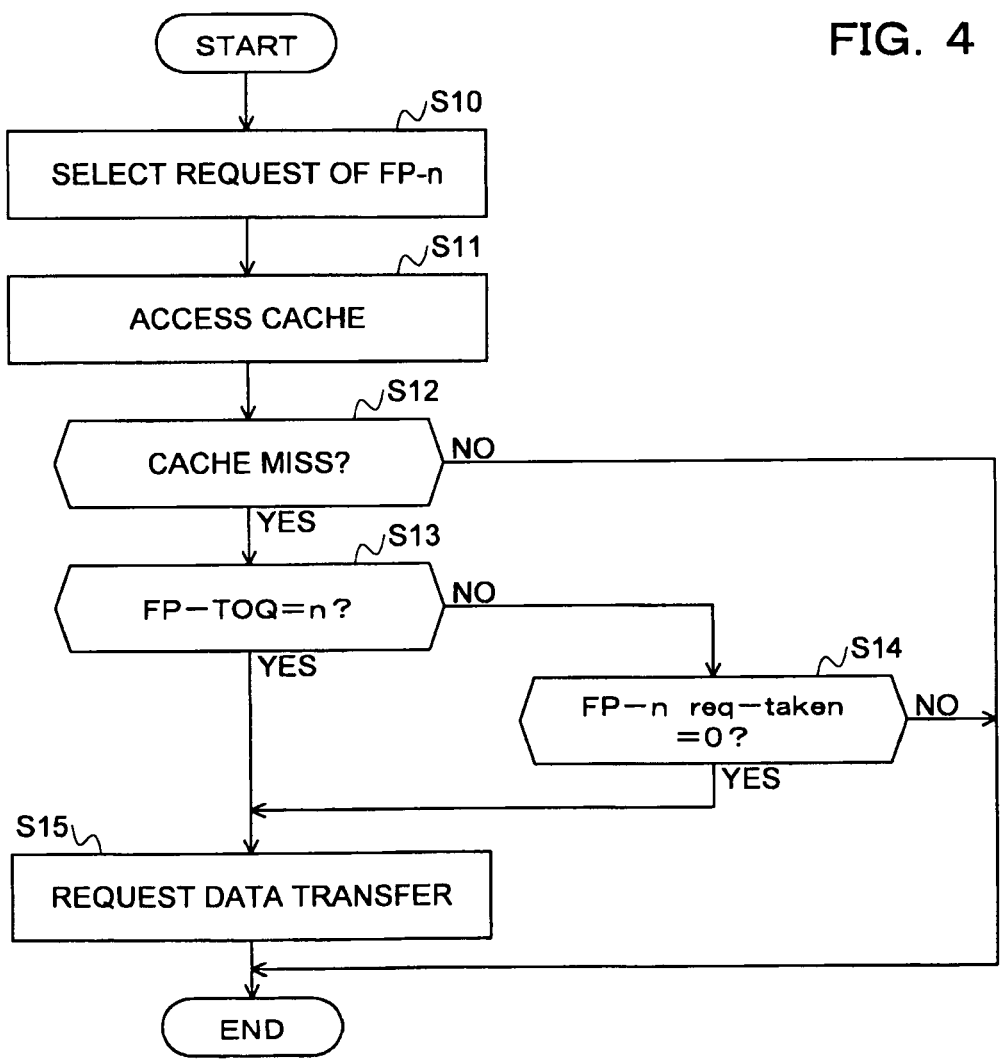
FIG. 4 is a processing flow chart of a data transfer request according to the present embodiment.

FIG. 4 is a processing flow chart of a data transfer request according to the present embodiment. In the flow chart of FIG. 4, FP-n (n=0, 1, 2, . . . ) denotes entries of the FP 22, and n (n=0, 1, 2, ... ) denotes numbers assigned to the entries, for convenience. In the requested flag (req-taken), "1" denotes that the request is taken, and "0" denotes that the request is not taken.

When a request held in the entry of FP-n is selected as a request to be processed (step S10), the primary cache RAM 21 is accessed based on an address indicated in the request (step S11). At this point, when a cache miss does not occur (step S12), a data transfer request to the secondary cache control unit 30 is not issued.

In a case that the cache miss occurs (step S12 Yes), when number of the entry indicated by the FP-TOQ 23 is number of the entry holding the request to be processed (step S13 Yes), a transfer request of the data is issued to the secondary cache control unit 30 (step S15).

In a case that the cache miss occurs (step S12 Yes), even when the number of the entry indicated by the FP-TOQ 23 is not the number of the entry holding the request to be processed (step S13 No), but when the requested flag (req-taken) of the entry is "0" (in other words, not requested) (step S14 Yes), a transfer request of the data is issued to the secondary cache control unit 30 (step S15).

Even in a case that a cache miss occurs (step S12 Yes), when the number of the entry indicated by the FP-TOQ 23 is not the number of the entry holding the request to be processed (step S13 No), and when the requested flag (req-taken) of the entry is "1" (in other words, requested) (step S14 No), the data transfer request is not issued to the secondary cache control unit 30.

FIGS. 5 to 12 are diagrams for explaining processing examples of a primary cache control unit according to the present embodiment. Here, more specific examples of processing by the primary cache control unit 20 according to the present embodiment is described using FIGS. 5 to 12. In the examples illustrated in FIGS. 5 to 12, the primary cache RAM 21 of the primary cache control unit 20 is formed by a set associative system including two ways, way-0 and way-1.

Figure 5A:
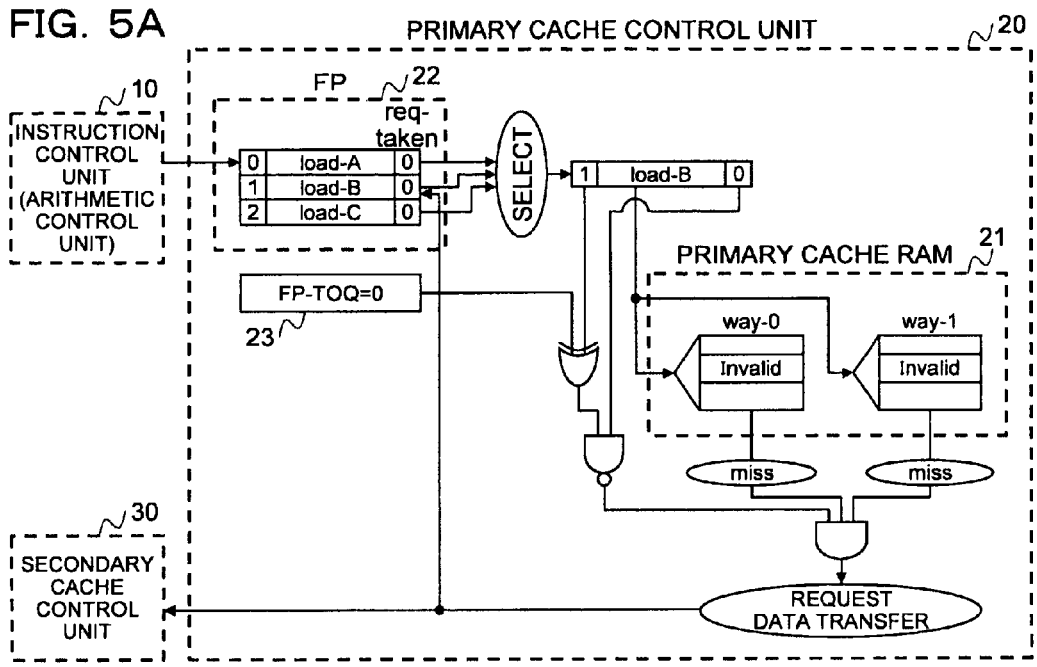
FIGS. 5 to 12 are diagrams for explaining processing examples of a primary cache control unit according to the present embodiment.

As illustrated in FIG. 5A, it is assumed that the instruction control unit (arithmetic control unit) 10 issues three memory access requests to the primary cache control unit 20. In this case, for convenience, the three memory access requests are written as load-A, load-B, and load-C. It is assumed that the three memory access requests are issued in order of load-A, load-B, and load-C, and that the cache indexes are the same but the physical addresses are different in the three memory access requests. The requests load-A, load-B, and load-C are temporarily and respectively held in the entries 0, 1, and 2 of the FP 22 of the primary cache control unit 20 in sequence (refer to FIG. 5A).

In FIGS. 5 to 12, numbers written on left of the memory access requests are numbers indicating entries of the FP 22. Hereinafter, the entries of the FP 22 is written as FP-n (n=0, 1, 2, ... ).

Here, since an entry which holds the oldest request or the load-A is FP-0, the FT-TOQ 23 indicates "0".

The primary cache control unit 20 has a function of processing requests in an out-of-order manner. In this circumstance, for example, it is assumed that the primary cache RAM 21 is accessed to process the load-B before processing of the load-A, which is the oldest request. At this point, when there is no target data of the load-B in the primary cache RAM 21, data transfer is requested to the secondary cache control unit 30 (refer to FIG. 5A). At this point, the requested flag (req-taken) of the entry FP-1 which holds the load-B is set to "1".

Figure 5B:
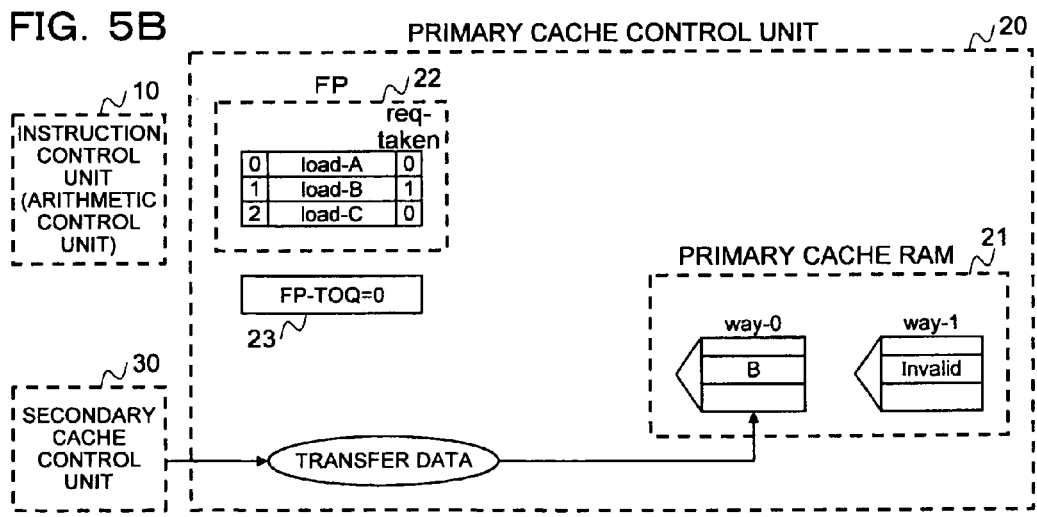

Then, the data is transferred from the secondary cache control unit 30, and registered in the way-0 of the primary cache RAM 21 (refer to FIG. 5B). Between the data transfer request and the registration of the data, only one processing of the same cache index can be executed at a time. Therefore, the processing of the load-A and the processing of the load-C are on standby in FP 22.

After the data registration for the load-B is finished, it is assumed that the primary cache RAM 21 is accessed to process the load-C before the processing of the load-A and the reprocessing of the load-B. At this point, when there is no target data of the load-C in the primary cache RAM 21, data transfer is requested to the secondary cache control unit 30 (refer to FIG. 6A). At this point, the requested flag (req-taken) of the entry FP-2 which holds the load-C is set to "1".

Figure 6A:
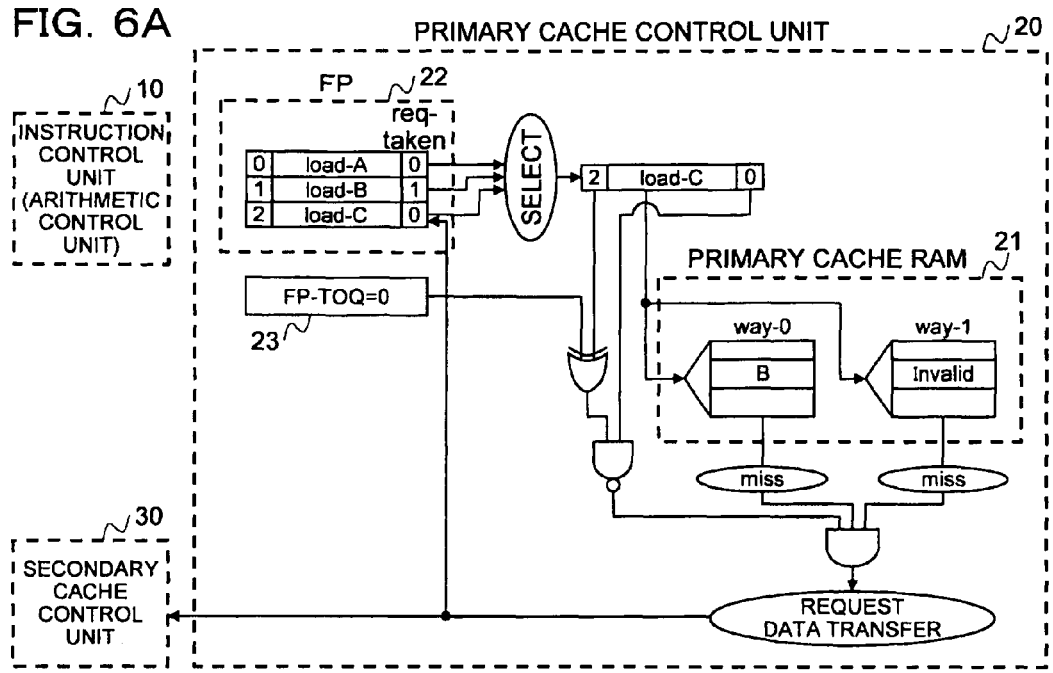
Figure 6B:
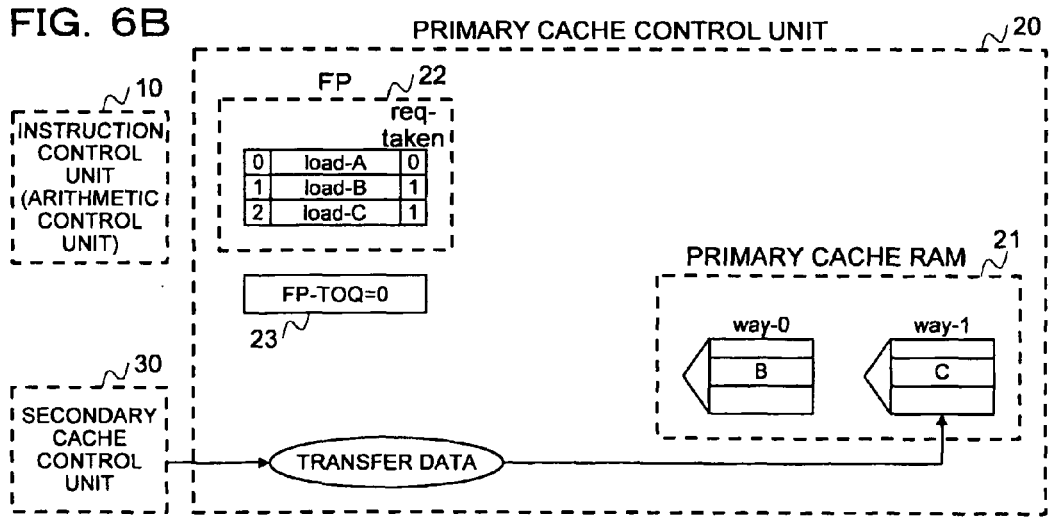

Then, the data is transferred from the secondary cache control unit 30, and registered in the way-1 of the primary cache RAM 21 (refer to FIG. 6B). Between the data transfer request to the registration of the data, only one processing of the same cache index can be executed at a time. Therefore, the processing of the load-A and the processing of the load-B are on standby in FP 22.

After the data registration for the load-C is finished, it is assumed that the primary cache RAM 21 is accessed to process the load-A before the reprocessing of the load-B and the reprocessing of the load-C. At this point, since there is no target data of the load-A in the primary cache RAM 21, data transfer is requested to the secondary cache control unit 30 (refer to FIG. 7A). At this point, the requested flag (req-taken) of the entry FP-0 which holds the load-A is set to "1".

Figure 7A:
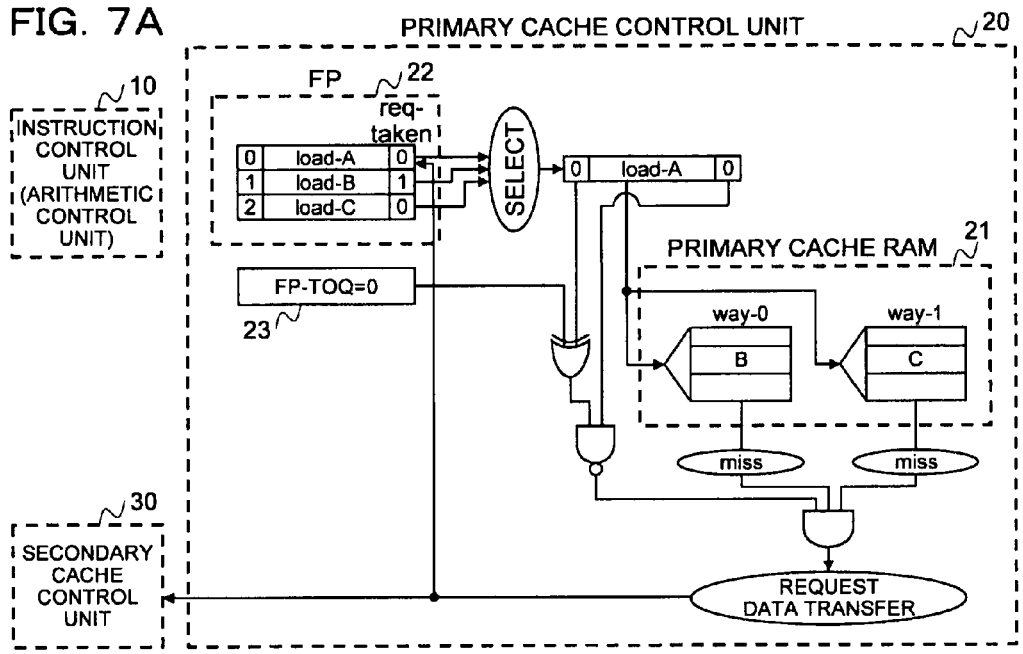
Figure 7B:
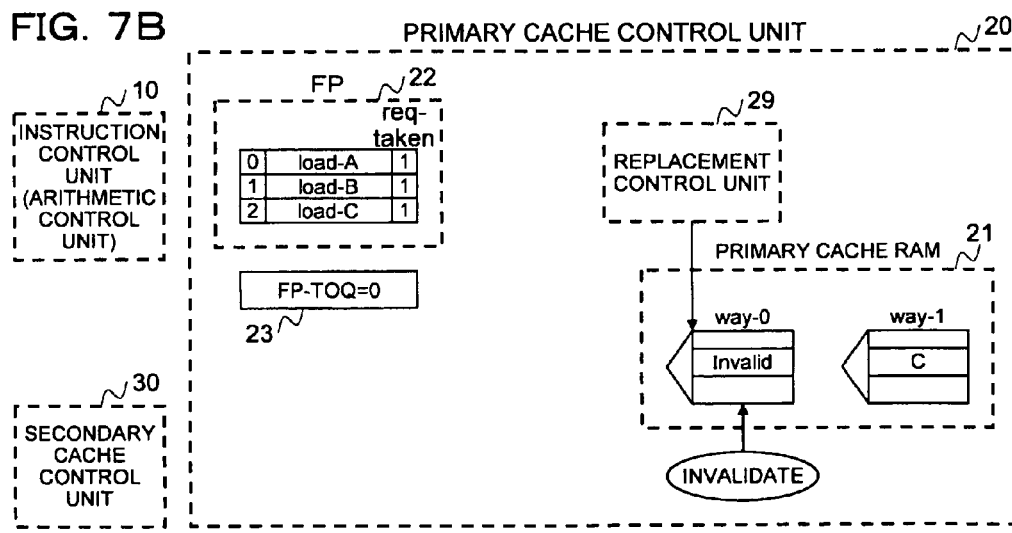

At the same time, there is valid data in both the way-0 and the way-1, the replacement control unit 29 sets the way-0 as a replacement target, and invalidates (Invalid) the target data of the load-B in the way-0 (refer to FIG. 7B).

Figure 8A:
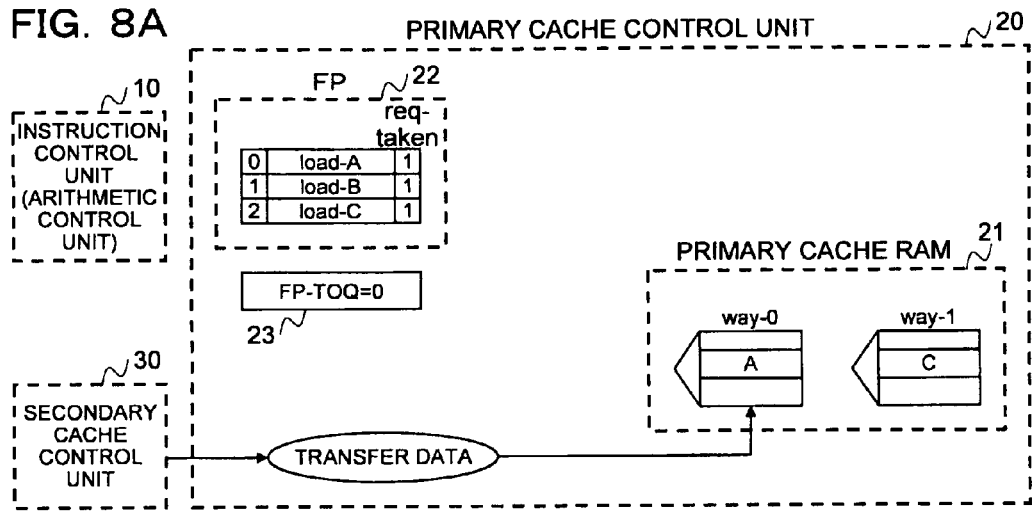
Figure 8B:
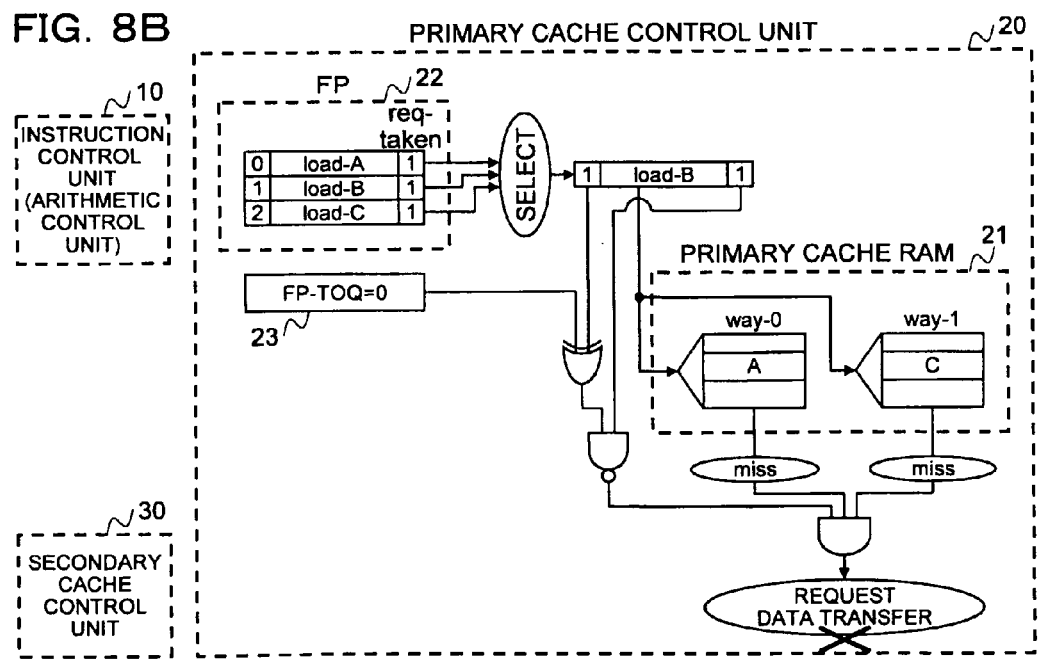
Figure 9A:
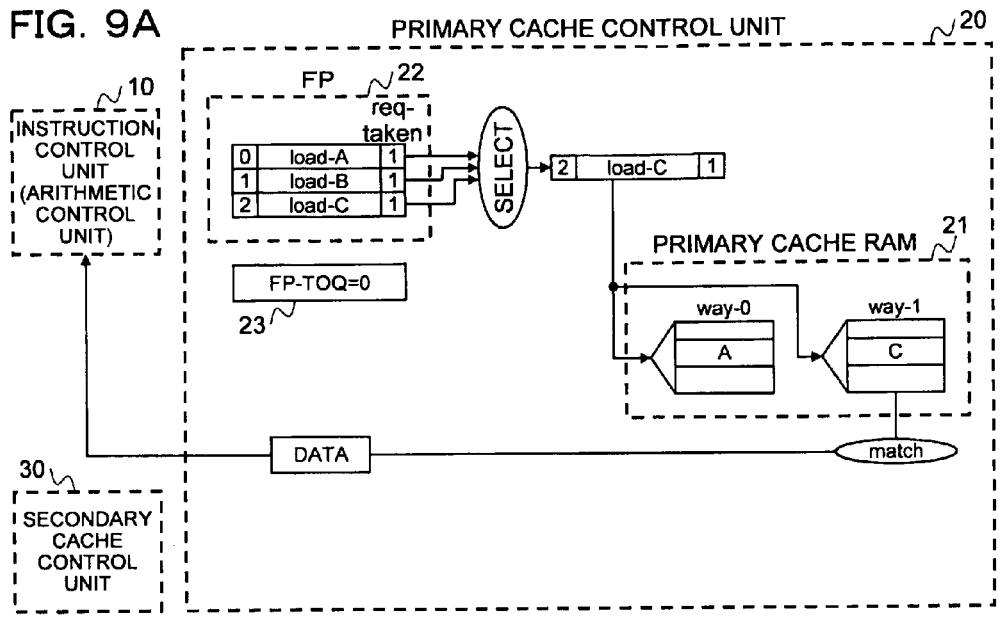
Figure 9B:
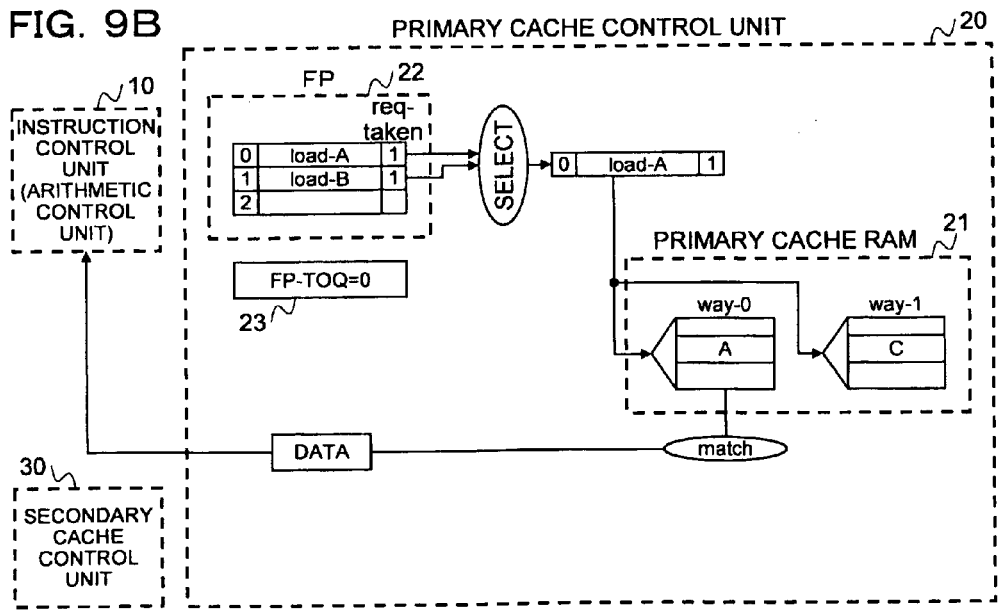

Then, the data is transferred from the secondary cache control unit 30, and registered in the way-0 of the primary cache RAM 21 (refer to FIG. 8A). Between the data transfer request and the registration of the data, only one processing of the same cache index can be executed at a time. Therefore, the processing of the load-B and the processing of the load-C are on standby in FP 22.

After the data registration for the load-A is finished, it is assumed that the primary cache RAM 21 is accessed to process the load-B before the reprocessing of the load-A and the reprocessing of the load-C. At this point, since the target data of the load-B previously registered in the way-0 is replaced by the target data of the load-A, there is no target data of the load-B in the primary cache RAM 21. However, the requested flag (req-taken) of the entry FP-1 which holds the load-B is "1", and the entry FP-1 is not an entry indicated by the FP-TOQ. Thus, the data transfer is not requested (refer to FIG. 8B).

Subsequently, it is assumed that the primary cache RAM 21 is accessed to process the load-C before the reprocessing of the load-A. At this point, the target data of the load-C is in the way-1 of the primary cache RAM 21. Thus, the data of the load-C is transmitted to the instruction control unit (arithmetic control unit) 10, and the processing of the entry FP-2 is finished (refer to FIG. 9A).

Subsequently, it is assumed that the primary cache RAM 21 is accessed to process the load-A. At this point, the target data of the load-A is in the way-0 of the primary cache RAM 21. Thus, the data of the load-A is transmitted to the instruction control unit (arithmetic control unit) 10, and the processing of the entry FP-0 is finished (refer to FIG. 9B). At this point, an entry indicated by the FP-TOQ 23 is updated to the entry FP-1.

Subsequently, it is assumed that the primary cache RAM 21 is accessed to process the load-B. At this point, the target data of the load-B previously registered in the way-0 is replaced by the target data of the load-A. Thus, there is no target data of the load-B in the primary cache RAM 21. Although the requested flag (req-taken) of the entry FP-1 which holds the load-B is "1", the entry FP-1 is an entry indicated by the FP-TOQ. Therefore, the requested flag (req-taken) is ignored, and data transfer is requested to the secondary cache control unit 30 (refer to FIG. 10A).

Figure 10A:
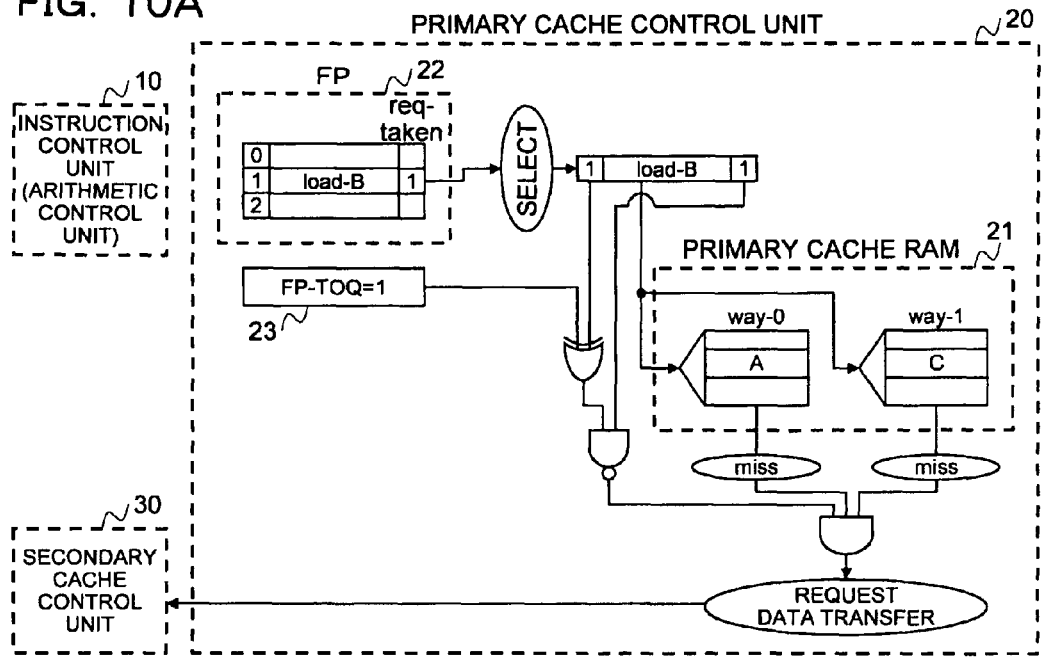
Figure 10B:
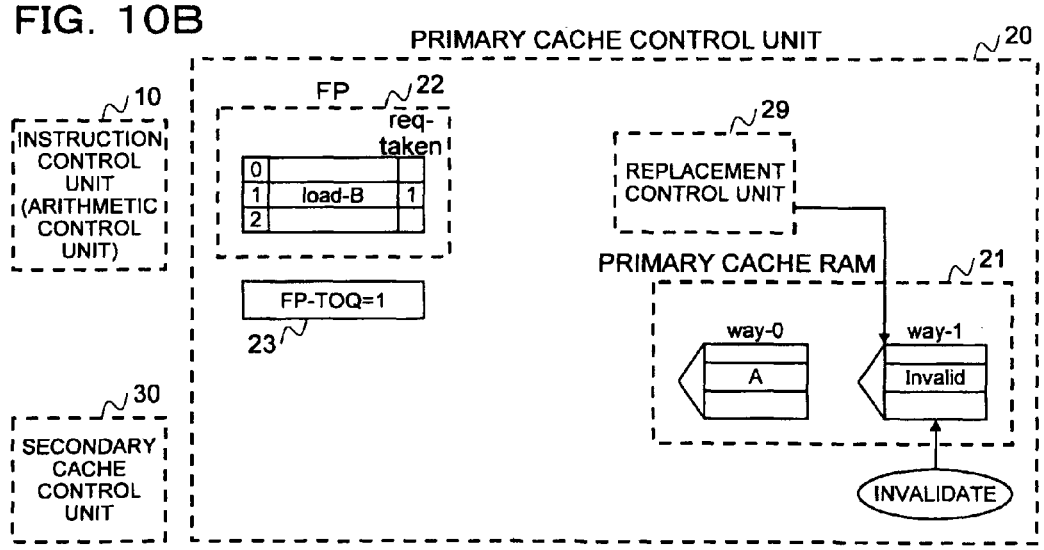

At the same time, since there is valid data in both the way-0 and the way-1, the replacement control unit 29 sets the way-1 as a replacement target, and invalidates (Invalid) the target data of the load-C in the way-1 (refer to FIG. 10B).

Figure 11A:
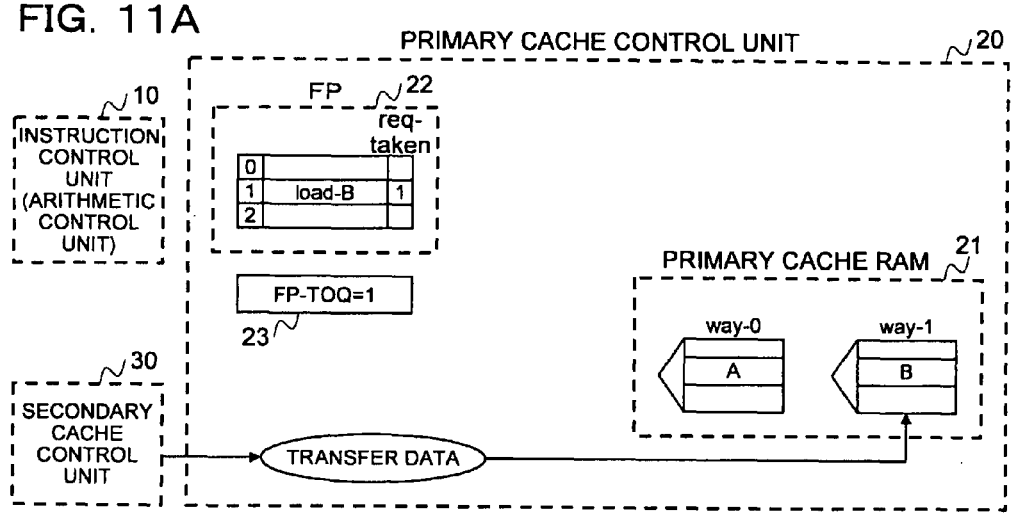
Figure 11B:
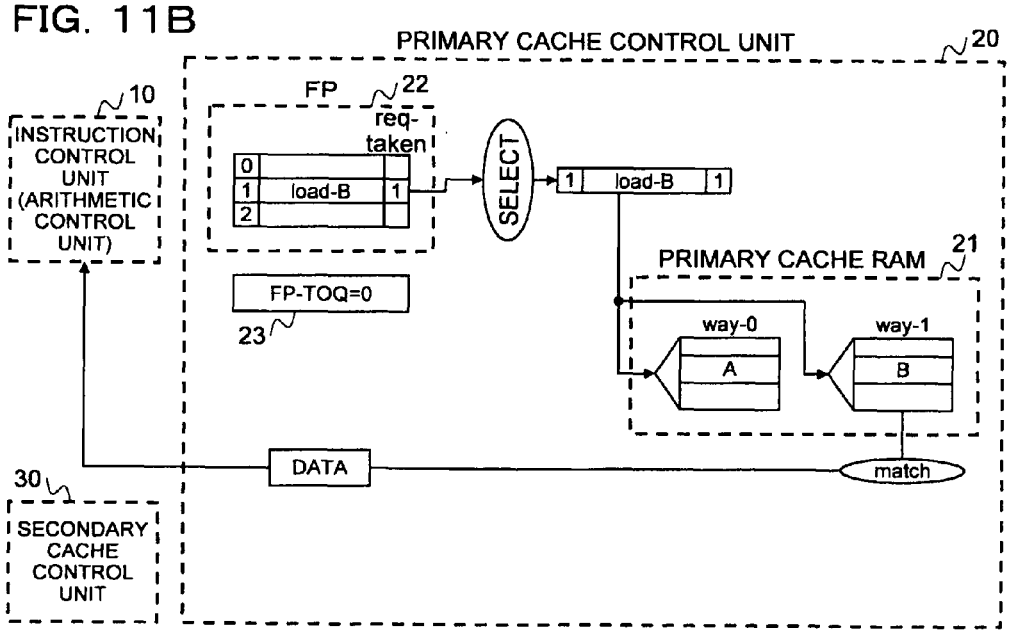
Figure 12:
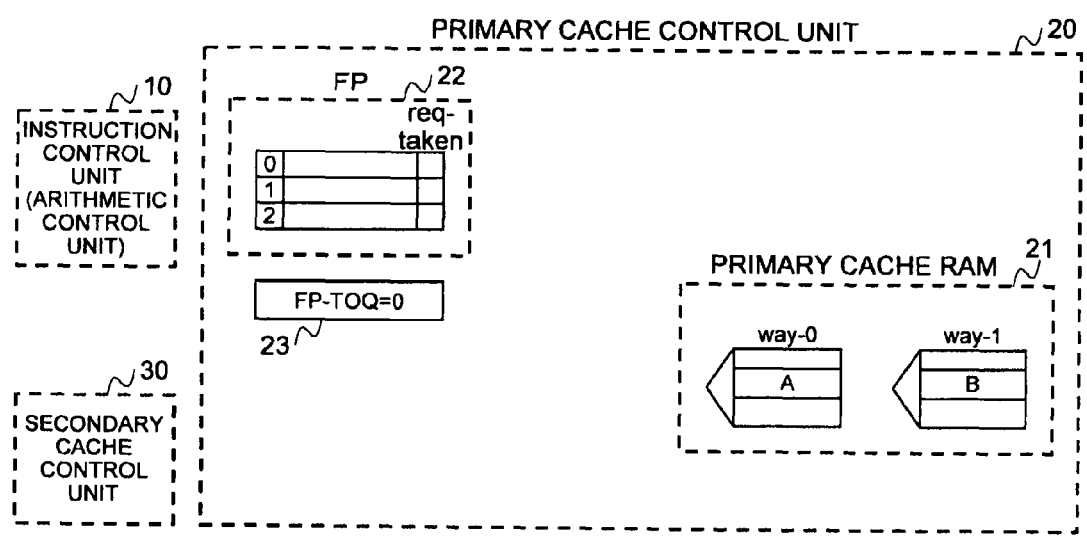

Then, the data of the load-B is transferred from the secondary cache control unit 30, and registered in the way-1 of the primary cache RAM 21 (refer to FIG. 11A).

The primary cache RAM 21 is accessed to reprocessing the load-B. At this point, there is the target data of the load-B in the way-1 of the primary cache RAM 21. Thus, the data of the load-B is transmitted to the instruction control unit (arithmetic control unit) 10, and the processing of the entry FP-1 is finished (refer to FIG. 11B).

In this way, the transfer request of the target data on the same request is not issued twice or more, until the request processing held in the oldest entry is executed which is indicated in the FP-TOQ 23 in the FP 22. As a result, a state can be prevented in which referenced data is kept being replaced on the cache and the instructions are not finished (refer to FIG. 12).

Next, another embodiment is described which has the following mechanism. The mechanism counts, when different data as targets of a plurality of requests are indicated in a same cache index, number of times to prevent replacement of the data as targets of the plurality of requests each other. The mechanism is used for performance evaluation, program tuning, etc.

Figure 13:
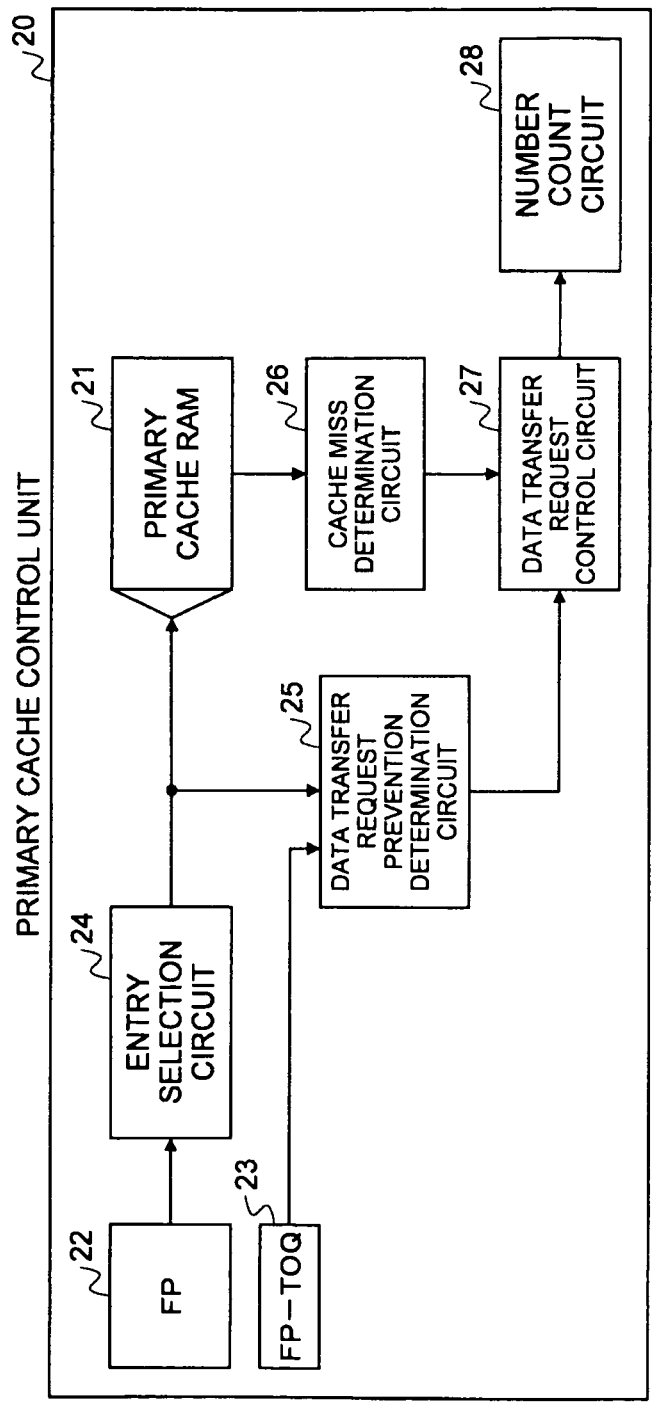
FIG. 13 is a diagram illustrating a structure example of the primary cache control unit according to the present embodiment.

FIG. 13 is a diagram illustrating a structure example of the primary cache control unit according to the present embodiment. The primary cache control unit 20 includes the primary cache RAM 21, the FP (Fetch Port) 22, the FP-TOQ (Fetch Port Top Of Queue) 23, the entry selection circuit 24, the data transfer request prevention determination circuit 25, the cache miss determination circuit 26, the data transfer request control circuit 27, and a number count circuit 28.

The primary cache RAM 21, the FP (Fetch Port) 22, the FP-TOQ (Fetch Port Top Of Queue) 23, the entry selection circuit 24, the data transfer request prevention determination circuit 25, the cache miss determination circuit 26, and the data transfer request control circuit 27 are the same as described in FIG. 2, and the description is not repeated.

In the case that the cache miss occurs, even when a transfer request of data as a target of the request to be processed is already issued, the number count circuit 28 counts, for each cache index, number of times that re-requests of data transfer are issued, because an entry which holds the request to be processed is the entry indicated in the FP-TOQ 23.

The information of the number of times held by the number count circuit 28 can be read out by an access circuit (not illustrated) from the outside, and is initialized by resetting.

Figure 14:
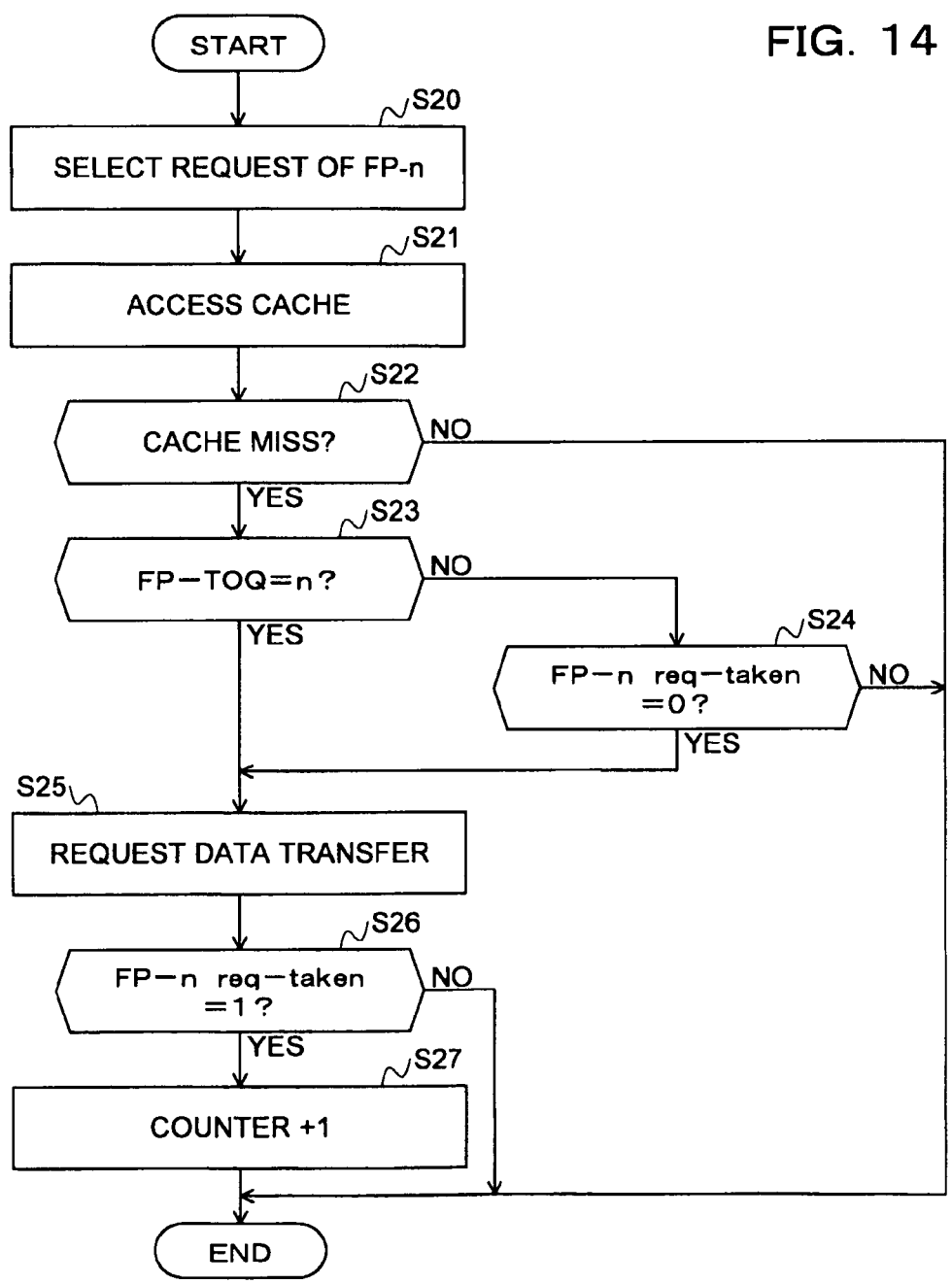
FIG. 14 is a processing flow chart of a data transfer request according to the present embodiment.

FIG. 14 is a processing flow chart of a data transfer request according to the present embodiment. In the flow chart of FIG. 14, when the requested flag (req-taken) of an entry which holds the request in processing is "1" (in other words, requested) at a time that a transfer request is issued to the secondary cache control unit 30, the count value of the cache index is increased. This increase is performed even when the request in processing is a request in which a data transfer request is issued once in the past. This increase is performed for indicating that a re-request of data transfer is issued, because the request is held in an entry indicated by the FP-TOQ 23.

In the flow chart of FIG. 14, FP-n (n=0, 1, 2, . . . ) denotes entries of the FP 22, and n (n=0, 1, 2, . . . ) denotes numbers assigned to the entries for convenience. In the requested flag (req-taken), "1" denotes that the request is taken, and "0" denotes that the request is not taken.

When a request held in an entry of FP-n is selected as a request to be processed (step S20), the primary cache RAM 21 is accessed based on the address indicated in the request (step S21). At this point, when a cache miss does not occur (step S22 No), a data transfer request to the secondary cache control unit 30 is not issued.

When the cache miss occurs (step S22 Yes), and when number of the entry indicated by the FP-TOQ 23 is number of an entry which holds the request to be processed (step S23 Yes), a transfer request of the data is issued to the secondary cache control unit 30 (step S25).

In the case that the cache miss occurs (step S22 Yes), even when the number of the entry indicated by the FP-TOQ 23 is not the number of the entry holding the request to be processed (step S23 No), and when the requested flag (req-taken) of the entry is "0" (in other words, not requested) (step S24 Yes), a transfer request of the data is issued to the secondary cache control unit 30 (step S25).

In the case that the cache miss occurs (step S22 Yes), when the number of the entry indicated by the FP-TOQ 23 is not the number of the entry holding the request to be processed (step S23 No), and when the requested flag (req-taken) of the entry is "1" (in other words, requested) (step S24 No), the data transfer request is not issued to the secondary cache control unit 30.

When the transfer request of the data is issued to the secondary cache control unit 30 (step S25), and when the requested flag (req-taken) of the entry FP-n is "1" (in other words, requested) (step S26 Yes), "1" is added to the counter of the cache index (step S27). When the requested flag (req-taken) of the entry FP-n is "0" (in other words, not requested) (step S26 No), the counter of the cache index is not operated, because this is the first data transfer request on the request held in the entry.

Figure 15:
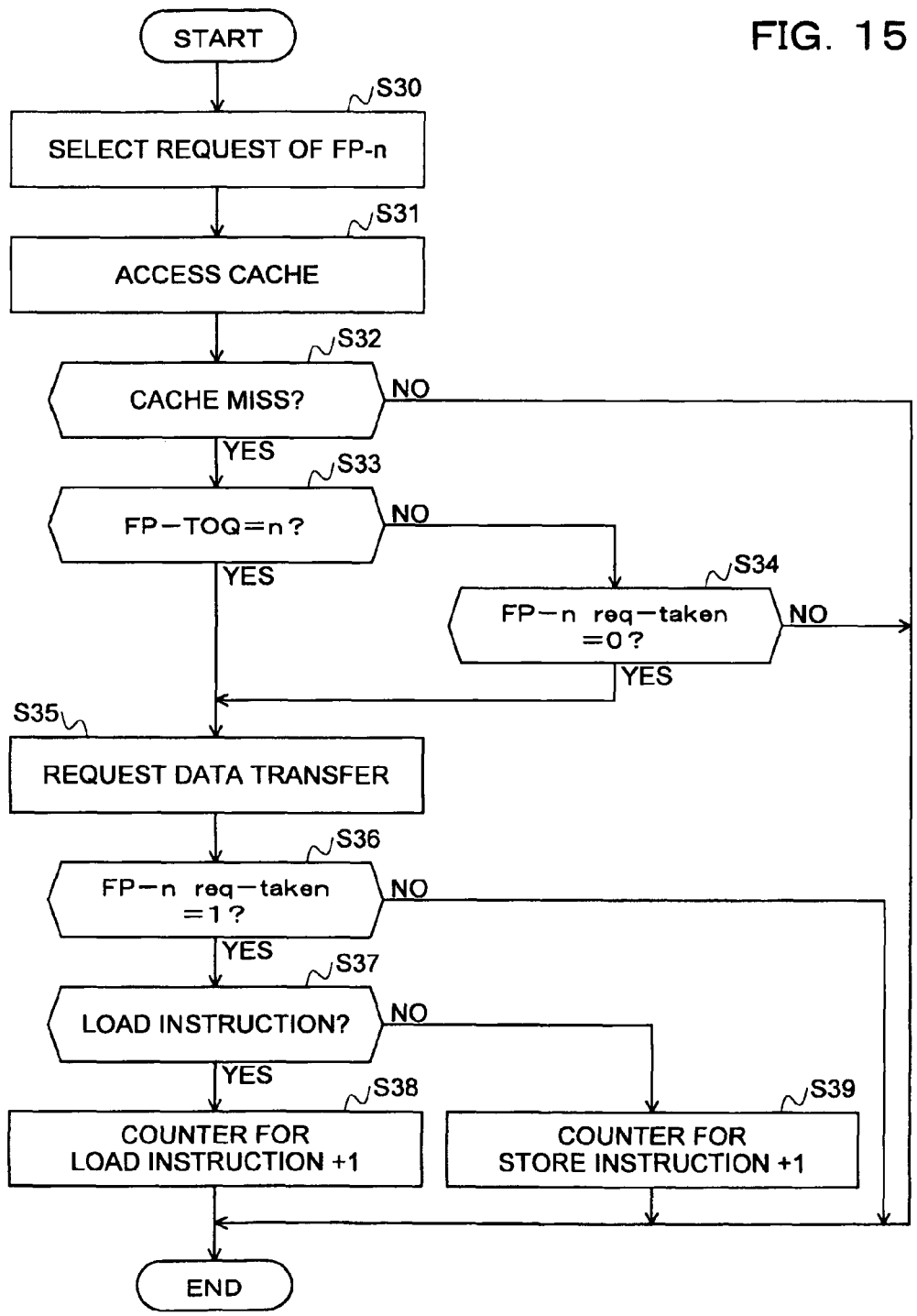
FIG. 15 is a processing flow chart of a data transfer request according to the present embodiment.
Figure 16A:
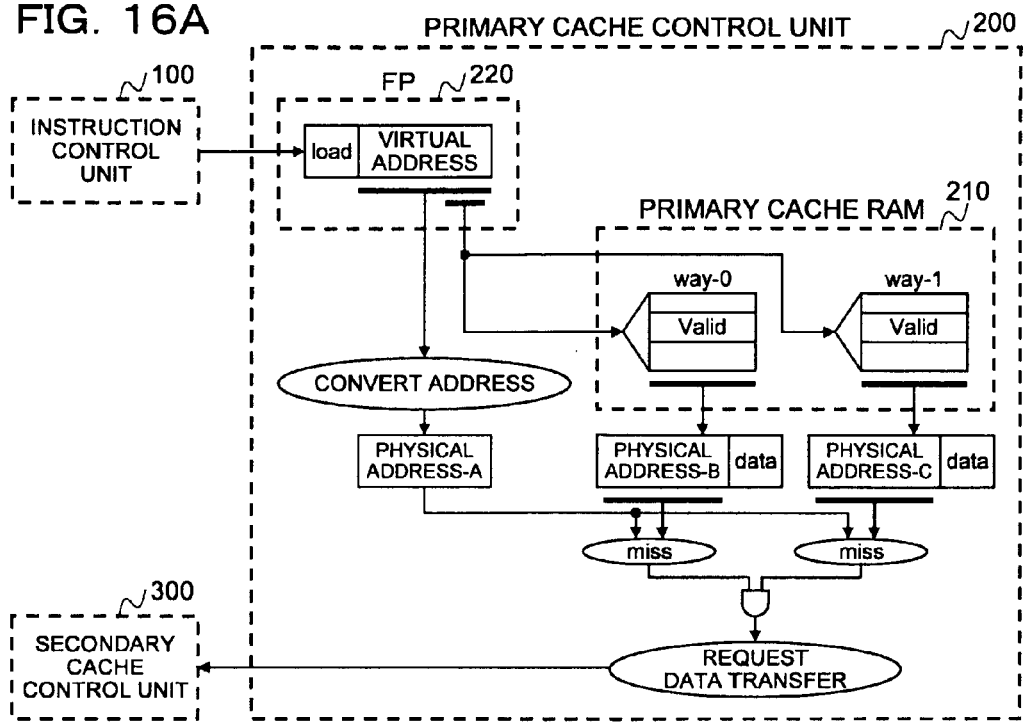
FIG. 16 is a diagram for explaining an example of reference, registration, and replacement of data in a primary cache control unit.
Figure 16B:
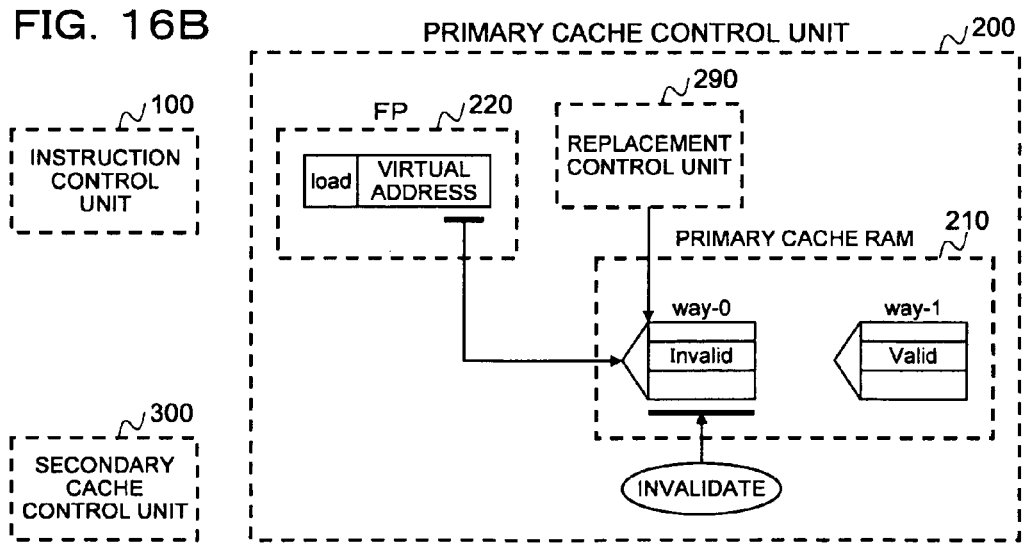
Figure 17A:
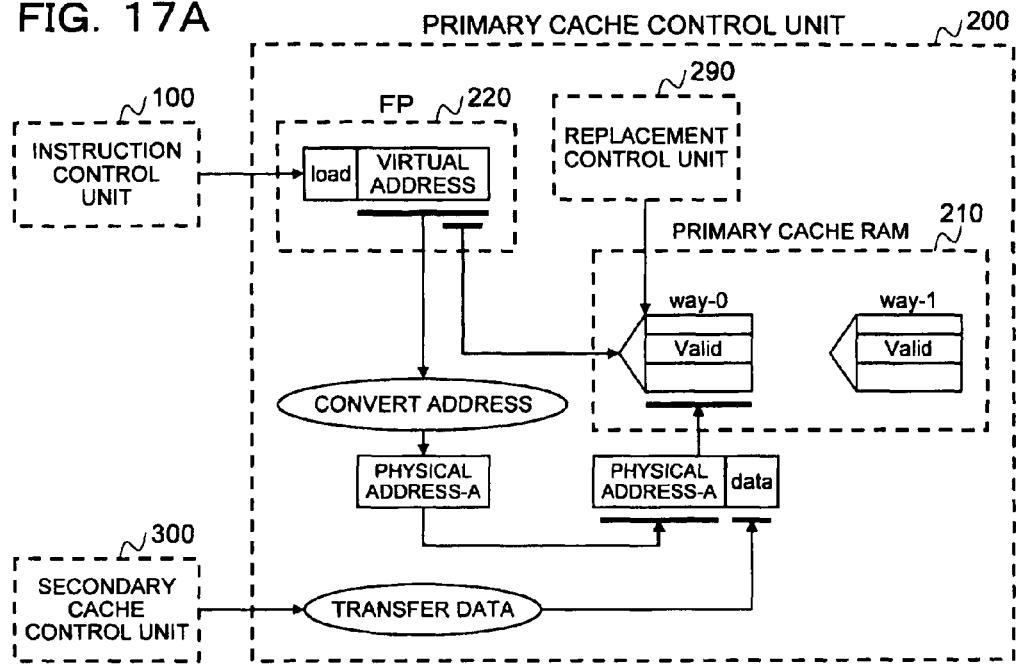
FIG. 17 is a diagram for explaining an example of reference, registration, and replacement of data in the primary cache control unit.
Figure 17B:
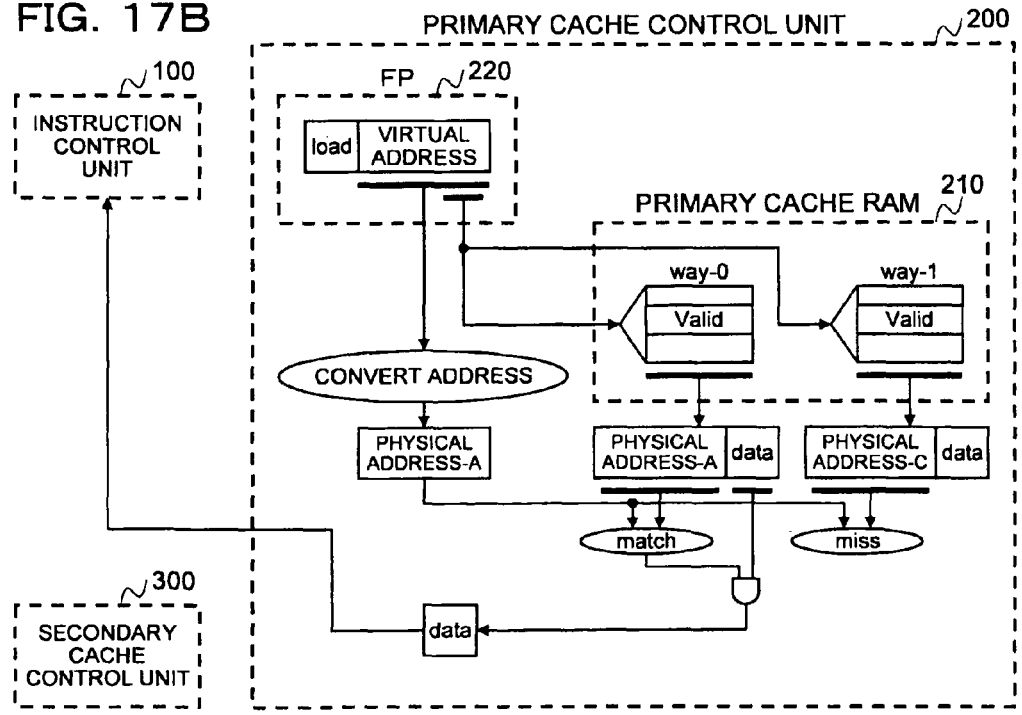

FIG. 15 is a processing flow chart of a data transfer request according to the present embodiment. In the processing illustrated in the flow chart of FIG. 15, a counter for a load instruction and a counter for a store instruction are prepared separately, and the counter to be operated is changed depending on whether the request in processing is the load instruction or the store instruction. As a result, the instruction type causing the replacement can be figured out.

In the flow chart of FIG. 15, FP-n (n=0, 1, 2, . . . ) denotes entries of the FP 22, and n (n=0, 1, 2, . . . ) denotes numbers assigned to the entries for convenience. In the requested flag (req-taken), "1" denotes that the request is taken, and "0" denotes that the request is not taken.

When a request held in an entry of FP-n is selected as a request to be processed (step S30), the primary cache RAM 21 is accessed based on the address indicated in the request (step S31). At this point, when a cache miss does not occur (step S32 No), a data transfer request to the secondary cache control unit 30 is not issued.

When the cache miss occurs (step S32 Yes), and when number of the entry indicated by the FP-TOQ 23 is number of the entry which holds the request to be processed (step S33 Yes), a transfer request of the data is issued to the secondary cache control unit 30 (step S35).

In the case that the cache miss occurs (step S32 Yes), even when the number of the entry indicated by the FP-TOQ 23 is not the number of the entry holding the request to be processed (step S33 No), and when the requested flag (req-taken) of the entry is "0" (in other words, not requested) (step S34 Yes), a transfer request of the data is issued to the secondary cache control unit 30 (step S35).

In the case that the cache miss occurs (step S32 Yes), when the number of the entry indicated by the FP-TOQ 23 is not the number of the entry holding the request to be processed (step S33 No), and when the requested flag (req-taken) of the entry is "1" (in other words, requested) (step S34 No), the data transfer request is not issued to the secondary cache control unit 30.

In a case that the transfer request of the data is issued to the secondary cache control unit 30 (step S35), when the requested flag (req-taken) of the entry FP-n is "1" (in other words, not requested) (step S36 Yes), and when the request in processing is a load instruction (step S37 Yes), "1" is added to the counter for the load instruction of the cache index (step S38).

In the case that the transfer request of the data is issued to the secondary cache control unit 30 (step S35), when the requested flag (req-taken) of the entry FP-n is "1" (in other words, requested) (step S36 Yes), and when the request in processing is not a load instruction, in other words, the request is a store instruction (step S37 No), "1" is added to the counter for the store instruction of the cache index (step S39).

In the case that the transfer request of the data is issued to the secondary cache control unit 30 (step S35), when the requested flag (req-taken) of the entry FP-n is "0" (in other words, not requested) (step S36 No), the counter of the cache index is not operated because this is the first data transfer request of the request held in the entry.

In this way, when different data as targets of a plurality of requests are indicated in a same cache index, the number of times to prevent the replacement of the data as targets of the plurality of requests each other is counted. A program can be designed by using the counted number of times as reference information for tuning the program. And, the performance of the program can be improved by designing the program with shifted cache indexes.

Although the present embodiment is described above, the present embodiment is not limited to this. For example, an example of controlling the data transfer request from the primary cache control unit 20 to the secondary cache control unit 30 is described in the present embodiment, the present embodiment can also be implemented in the same way by a processor or a system without a secondary cache. The present embodiment can be applied as long as the control is for data transfer request from the cache control unit to other storage means.

The present embodiment relates to a technique used in an information processing apparatus, and particularly, is a technique used in a computer including a cache.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. A cache memory control apparatus, comprising:
a cache memory;
a fetch port, including a plurality of entries, configured to hold access requests to the cache memory, and hold a requested flag that is provided for each of the plurality of entries of the fetch port indicating whether a data transfer is requested;
a queue register configured to hold information that indicates an entry holding an oldest access request among the plurality of entries of the fetch port;
an entry selection circuit configured to select an access request to be processed next from the access requests held in the plurality of entries of the fetch port;
a cache miss determination circuit configured to determine whether there is data of the access request selected by the entry selection circuit in the cache memory;
a data transfer request control circuit configured to request, when there is no data of the access request in the cache memory, data transfer to the cache memory from an outside;
a data transfer request prevention determination circuit configured to prevent, when a requested flag of an entry that holds the access request selected by the entry selection circuit indicates that the data transfer is requested by the data transfer request control circuit, and when the entry is different from an entry that is indicated by information held by the queue register, the data transfer request caused by the access request by the data transfer request control circuit, and
a number count circuit configured to count, for each of a plurality of cache indexes each indicating the data storage location in the cache memory, a number of times that re-requests of the data transfer are issued by the data transfer request control circuit when the cache miss determination circuit determines that there is no data of the access request in the cache memory, when the data transfer request prevention determination circuit determines that the requested flag of the entry of the fetch port holding the access request indicates that the data transfer is requested, and when the entry matches an entry that is indicated by information held by the queue register,
wherein the number count circuit distinguishes a case that the access request is a load instruction and a case that the access request is a store instruction, and number count circuit counts the number of times that the re-requests of the data transfer are issued on the load instruction and the store instruction respectively.

2. A cache memory control method to control transfer of data of access requests to a cache memory included in a cache memory control circuit which further includes a fetch port and holds access requests to the cache memory, a request flag indicating whether a data transfer is requested where the request flag is provided for each of a plurality of entries of the fetch port, and a queue register holding information that indicates an entry holding an oldest access request among the plurality of entries of the fetch port, the cache memory control method comprising:
setting, by using a data transfer request control circuit provided in a cache memory control circuit, when a request for a data transfer to outside of the cache memory occurs, a requested flag provided for each of the plurality of entries of the fetch port, and indicating whether the data transfer to the cache memory is requested;
controlling, by using a data transfer request prevention determination circuit provided in the cache memory control circuit, when the requested flag of an entry holding an access request as a processing target indicates that data transfer is requested, and when the entry holding the access request as a processing target is different from an entry that is indicated by information held by the queue register, to prevent data transfer request caused by the access request even when a cache miss occurs in the access request;

preventing re-request of the data transfer by processing of the access request held in an entry in which the data transfer is once requested until the entry becomes an oldest entry among all entries in the fetch port; and counting, by using a number count circuit provided in the cache memory control circuit, for each of a plurality of cache indexes each indicating a data storage location in the cache memory, a number of times that re-requests of the data transfer is issued, when the cache miss occurs, and when the re-requests of the data transfer are issued, resulted from that the entry is the entry holding the oldest access request even when the requested flag of the entry of the fetch port holding the access request indicates that the data transfer is requested, and wherein the number count circuit counts the number of times of issuance of re-requests distinguishing whether an access request is one of a load instruction and a store instruction respectively.

\* \* \* \* \*